(12) United States Patent
Chandrasekaran et al.

(10) Patent No.: US 10,613,947 B2
(45) Date of Patent: Apr. 7, 2020

(54) SAVING AND RESTORING STORAGE DEVICES USING APPLICATION-CONSISTENT SNAPSHOTS

(71) Applicant: Nutanix, Inc., San Jose, CA (US)

(72) Inventors: Karthik Chandrasekaran, Bangalore (IN); Parthasarathy Ramachandran, Palo Alto, CA (US)

(73) Assignee: Nutanix, Inc., San Jose, CA (US)

( * ) Notice: Subject to any disclaimer, the term of this patent is extended or adjusted under 35 U.S.C. 154(b) by 0 days.

(21) Appl. No.: 15/178,504

(22) Filed: Jun. 9, 2016

(65) Prior Publication Data
US 2020/0034250 A1    Jan. 30, 2020

(51) Int. Cl.
*G06F 9/455* (2018.01)
*G06F 11/14* (2006.01)
*H04L 29/06* (2006.01)

(52) U.S. Cl.
CPC ...... *G06F 11/1469* (2013.01); *G06F 9/45558* (2013.01); *H04L 65/4076* (2013.01); *G06F 2009/45583* (2013.01); *G06F 2009/45595* (2013.01); *G06F 2201/84* (2013.01)

(58) Field of Classification Search
None
See application file for complete search history.

(56) References Cited

U.S. PATENT DOCUMENTS

| | | | |
|---|---|---|---|
| 7,979,395 B1 | 7/2011 | Aggarwal et al. | |
| 8,046,550 B2 * | 10/2011 | Feathergill | G06F 11/1466 711/162 |
| 8,135,930 B1 | 3/2012 | Mattox et al. | |
| 8,151,263 B1 | 4/2012 | Venkitachalam et al. | |
| 8,166,265 B1 * | 4/2012 | Feathergill | G06F 11/1466 711/161 |
| 8,234,469 B2 * | 7/2012 | Ranade | G06F 11/1451 707/602 |

(Continued)

OTHER PUBLICATIONS

Li et al. "iROW: An Efficient Live Snapshot System for Virtual Machine Disk", 2012 IEEE, pp. 376-383.*

(Continued)

*Primary Examiner* — Van H Nguyen
(74) *Attorney, Agent, or Firm* — Vista IP Law Group, LLP

(57) ABSTRACT

Systems for disaster recovery techniques. A method for capturing snapshots in a clustered virtualization environment commences upon identifying user virtual machines to be grouped together to form an application group. A virtualized controller sends or broadcasts messages to the plurality of user virtual machines where the messages request the user virtual machines to quiesce their respective transactions and other application activities. The user virtual machines associated with the application group quiesce their processing, flush their caches, and flush their file data. The virtualized controller waits for confirmations that the application activities associated with the application group have been quiesced. A backup agent commences activities to capture a snapshot of the storage devices associated with quiesced application processes. The application processes can run in conjunction with a hypervisor, or they can run as process containers. The application-consistent snapshot can be used on a different cluster to bring up the same application.

27 Claims, 17 Drawing Sheets

(56) References Cited

U.S. PATENT DOCUMENTS

| | | | |
|---|---|---|---|
| 8,335,902 B1* | 12/2012 | Feathergill | G06F 11/1466 |
| | | | 711/161 |
| 8,364,858 B1 | 1/2013 | Martin et al. | |
| 8,549,518 B1 | 10/2013 | Aron et al. | |
| 8,601,473 B1 | 12/2013 | Aron et al. | |
| 8,656,386 B1 | 2/2014 | Baimetov | |
| 8,756,598 B1 | 6/2014 | Costea et al. | |
| 8,762,967 B2 | 6/2014 | Kim | |
| 8,850,130 B1 | 9/2014 | Aron et al. | |
| 8,914,595 B1* | 12/2014 | Natanzon | G06F 3/0641 |
| | | | 711/161 |
| 9,009,106 B1 | 4/2015 | Aron et al. | |
| 9,043,567 B1 | 5/2015 | Modukuri et al. | |
| 9,069,708 B2 | 6/2015 | Gill et al. | |
| 9,135,127 B1 | 9/2015 | Havemose | |
| 9,348,634 B2* | 5/2016 | Allen | G06F 9/45558 |
| 9,377,964 B2* | 6/2016 | Sharma | G06F 3/065 |
| 9,396,200 B2* | 7/2016 | Jacoby | G06F 17/30088 |
| 9,430,333 B2* | 8/2016 | D'Amato | G06F 11/1458 |
| 9,501,233 B2* | 11/2016 | Harris | G06F 17/30312 |
| 9,547,562 B1 | 1/2017 | Feathergill et al. | |
| 9,588,870 B2* | 3/2017 | Marron | G06F 11/362 |
| 9,772,866 B1 | 9/2017 | Aron et al. | |
| 9,823,973 B1* | 11/2017 | Natanzon | G06F 11/1446 |
| 9,886,215 B1 | 2/2018 | Ramachandran et al. | |
| 10,061,656 B2* | 8/2018 | Zou | G06F 11/1464 |
| 10,423,609 B1 | 9/2019 | Strauss | |
| 2004/0143832 A1 | 7/2004 | Yamamoto et al. | |
| 2005/0055603 A1 | 3/2005 | Soran et al. | |
| 2006/0101189 A1 | 5/2006 | Chandrasekaran et al. | |
| 2007/0074208 A1 | 3/2007 | Ling | |
| 2007/0079298 A1 | 4/2007 | Tian | |
| 2007/0174915 A1 | 7/2007 | Gribble et al. | |
| 2007/0244938 A1 | 10/2007 | Micheal et al. | |
| 2008/0052331 A1 | 2/2008 | Ogawa et al. | |
| 2008/0065854 A1 | 3/2008 | Schoenberg et al. | |
| 2008/0115143 A1 | 5/2008 | Shimizu et al. | |
| 2008/0244028 A1 | 10/2008 | Le | |
| 2009/0125678 A1 | 5/2009 | Tokuda et al. | |
| 2009/0260007 A1 | 10/2009 | Beaty et al. | |
| 2010/0011178 A1 | 1/2010 | Feathergill | |
| 2010/0077142 A1 | 3/2010 | Fienblit et al. | |
| 2010/0077165 A1 | 3/2010 | Lu et al. | |
| 2010/0162242 A1 | 6/2010 | Grouzdev | |
| 2010/0287407 A1 | 11/2010 | Basu et al. | |
| 2010/0299309 A1* | 11/2010 | Maki | G06F 11/1479 |
| | | | 707/640 |
| 2011/0047340 A1 | 2/2011 | Olson et al. | |
| 2011/0154378 A1 | 6/2011 | Kishan et al. | |
| 2011/0219201 A1 | 9/2011 | Ranade | |
| 2011/0307531 A1 | 12/2011 | Gaponenko et al. | |
| 2012/0005668 A1 | 1/2012 | Serizawa | |
| 2012/0117299 A1 | 5/2012 | Waldspurger | |
| 2012/0144391 A1 | 6/2012 | Ueda | |
| 2012/0167082 A1 | 6/2012 | Kumar | |
| 2012/0188592 A1 | 7/2012 | Handley | |
| 2012/0331462 A1 | 12/2012 | Falko | |
| 2013/0179574 A1 | 7/2013 | Calder et al. | |
| 2013/0198489 A1 | 8/2013 | Branson et al. | |
| 2013/0227558 A1 | 8/2013 | Du | |
| 2014/0195753 A1 | 7/2014 | Khatri et al. | |
| 2014/0229949 A1 | 8/2014 | Cai | |
| 2014/0282824 A1 | 9/2014 | Lango et al. | |
| 2014/0317265 A1 | 10/2014 | James et al. | |
| 2014/0325170 A1 | 10/2014 | Aswathanarayana et al. | |
| 2014/0365740 A1 | 12/2014 | Vasilyev et al. | |
| 2015/0180714 A1 | 6/2015 | Chunn | |
| 2015/0188775 A1 | 7/2015 | Van Der Walt | |
| 2015/0248402 A1 | 9/2015 | Patterson, III | |
| 2015/0317177 A1* | 11/2015 | Hussain | H04L 67/1097 |
| | | | 718/1 |
| 2016/0004451 A1* | 1/2016 | Lakshman | G06F 3/065 |
| | | | 711/162 |
| 2016/0054774 A1 | 2/2016 | Song et al. | |
| 2016/0124764 A1* | 5/2016 | Nithrakashyap | G06F 3/0619 |
| | | | 718/1 |
| 2016/0124972 A1* | 5/2016 | Jain | G06F 3/0619 |
| | | | 707/673 |
| 2016/0202916 A1 | 7/2016 | Cui et al. | |
| 2016/0203013 A1 | 7/2016 | Bayapuneni et al. | |
| 2016/0292074 A1* | 10/2016 | Awasthi | G06F 13/4027 |

OTHER PUBLICATIONS

Yu et al. "SNPdisk: An Efficient Para-Virtualization Snapshot Mechanism for Virtual Disks in Private Clouds", 2011 IEEE, pp. 20-26.*

Chuang et al. "Generating Snapshot Backups in Cloud Virtual Disks", 2014 IEEE, pp. 1860-1863.*

Kangarlou et al. "Taking Snapshots of Virtual Networked Environments", 2007 ACM, 3 pages.*

Huang et al. "VMCSnap: Taking Snapshots of Virtual Machine Cluster with Memory Deduplication", 2014 IEEE, pp. 314-319.*

Non-final Office Action dated Jun. 4, 2015 for related U.S. Appl. No. 13/926,921.

Final Office Action dated Dec. 22, 2015 for related U.S. Appl. No. 13/926,921.

International Search Report and Written Opinion dated May 30, 2014 for related PCT Patent Application No. PCT/US13/78389.

Non-final Office Action dated Mar. 12, 2015 for related U.S. Appl. No. 13/918,660.

Final Office Action dated Aug. 31, 2015 for related U.S. Appl. No. 13/918,660.

Non-final Office Action dated Jan. 6, 2016 for related U.S. Appl. No. 13/928,097.

Final Office Action dated May 10, 2016 for related U.S. Appl. No. 13/928,097.

International Search Report and Written Opinion dated Jun. 22, 2015 for related PCT Patent Application No. PCT/US2015/020144.

Non-final Office Action dated Sep. 28, 2015 for related U.S. Appl. No. 14/206,924.

Final Office Action dated May 19, 2016 for related U.S. Appl. No. 14/206,924.

Non-final Office Action dated Jun. 3, 2016 for related U.S. Appl. No. 14/278,429.

Non-final Office Action dated Jun. 7, 2016 for related U.S. Appl. No. 13/918,660.

Advisory Action dated Aug. 5, 2016 for related U.S. Appl. No. 14/206,924.

Non-final Office Action dated Aug. 11, 2016 for related U.S. Appl. No. 13/926,921.

Final Office Action dated Oct. 3, 2016 for related U.S. Appl. No. 13/918,660.

Xiao, et al., "Implementaion and Performance Evaluation of Two Snapshot Methods on iSCSI Target Storages", 2006, 11 pages.

Xiv Storage Reinvented, Snapshots Reinvented IBM XIV Storage System, Copyright IBM Corporation 2008, 17 pages.

Pai, Vivek, "COS 318: Operation Systems Snapshot and NFS", Computer Science Department, Princeton University, 2011, 24 pages.

Agarwal, et al., "Snapshots in Hadoop Distributed File System", 2011, 5 pages.

Navarro, et al., "FuSnap: Fuzzy Control of Logical Volume Snapshot Replication for Disk Arrays", Copyright 2010, 9 pages.

Sankaran et al., "Volume Shadow Copy Service", Storage Environment, Power Solutions, Mar. 2004, 4 pages.

"CA ARCserve Backup for Windows", Microsoft Volume Shadow Copy Service Guide r15, Copyright 2010.

Overland Storage, "Hardware Provider for Microsoft Volume Shadow Copy Service (VSS) User Guide", Ultamus Raid, Copyright 2008, 20 pages.

IBM, "IBM XIV Provider for Microsoft Windows Volume Shadow Copy Service" Version 2.4.0, Release Notes, Copyright 2009, 2013, 18 pages.

(56) References Cited

OTHER PUBLICATIONS

Fujitsu Limited, "VSS Backup Solution for Exchange Server 2007 and Symantec Backup Exec 12.5 using ETERNUS VSS Hardware Provider" System Configuration Guide, Copyright 2009, 45 pages.
Final Office Action dated Nov. 30, 2016 for related U.S. Appl. No. 14/278,429.
Notice of Allowance and Fee(s) due dated Jan. 25, 2017 for related U.S. Appl. No. 13/918,660.
Final Office Action dated Mar. 2, 2017 for related U.S. Appl. No. 13/926,921.
Notice of Allowance dated Mar. 9, 2017 for related U.S. Appl. No. 14/278,429.
Notice of Allowance dated Mar. 27, 2017 for related U.S. Appl. No. 13/928,097.
Advisory Action dated May 25, 2017 for related U.S. Appl. No. 13/926,921.
Extended European Search Report dated Oct. 16, 2017 for EP Application No. 15760880.3, 10 pages.
U.S. Appl. No. 15/160,347, filed May 20, 2016, 62 pages.
Poitras, Steven. "The Nutanix Bible" (Oct. 15, 2013), from http://stevenpoitras.com/the-nutanix-bible/ (Publication date based on indicated capture date by Archive.org; first publication date unknown).
Poitras, Steven. "The Nutanix Bible" (Jan. 11, 2014), from http://stevenpoitras.com/the-nutanix-bible/ (Publication date based on indicated capture date by Archive.org; first publication date unknown).
Poitras, Steven. "The Nutanix Bible" (Jun. 20, 2014), from http://stevenpoitras.com/the-nutanix-bible/ (Publication date based on indicated capture date by Archive.org; first publication date unknown).
Poitras, Steven. "The Nutanix Bible" (Jan. 7, 2015), from http://stevenpoitras.com/the-nutanix-bible/ (Publication date based on indicated capture date by Archive.org; first publication date unknown).
Poitras, Steven. "The Nutanix Bible" (Jun. 9, 2015), from http://stevenpoitras.com/the-nutanix-bible/ (Publication date based on indicated capture date by Archive.org; first publication date unknown).
Poitras, Steven. "The Nutanix Bible" (Sep. 4, 2015), from https://nutanixbible.com/.
Poitras, Steven. "The Nutanix Bible" (Jan. 12, 2016), from https://nutanixbible.com/.
Poitras, Steven. "The Nutanix Bible" (Jun. 9, 2016), from https://nutanixbible.com/.
Poitras, Steven. "The Nutanix Bible" (Jan. 3, 2017), from https://nutanixbible.com/.
Poitras, Steven. "The Nutanix Bible" (Jun. 8, 2017), from https://nutanixbible.com/.
Poitras, Steven. "The Nutanix Bible" (Jan. 3, 2018), from https://nutanixbible.com/.
Poitras, Steven. "The Nutanix Bible" (Jun. 25, 2018), from https://nutanixbible.com/.
Poitras, Steven. "The Nutanix Bible" (Jan. 8, 2019), from https://nutanixbible.com/.
Non-Final Office Action dated Nov. 15, 2018 for related U.S. Appl. No. 14/206,924, 16 pages.
European Office Action dated Mar. 26, 2019 for related EP Application No. 15760880.3.
Non-Final Office Action dated May 23, 2019 for related U.S. Appl. No. 15/981,873.
Final Office Action dated Aug. 8, 2019 for related U.S. Appl. No. 14/206,924.
Final Office Action dated Oct. 31, 2019 for related U.S. Appl. No. 15/981,873.
Cano, I. et al., "Curator: Self-Managing Storage for Enterprise Clusters", 14th USENIX Symposium on Networked Systems Design and Implementation, NSDI '17, (Mar. 27, 2017).

\* cited by examiner

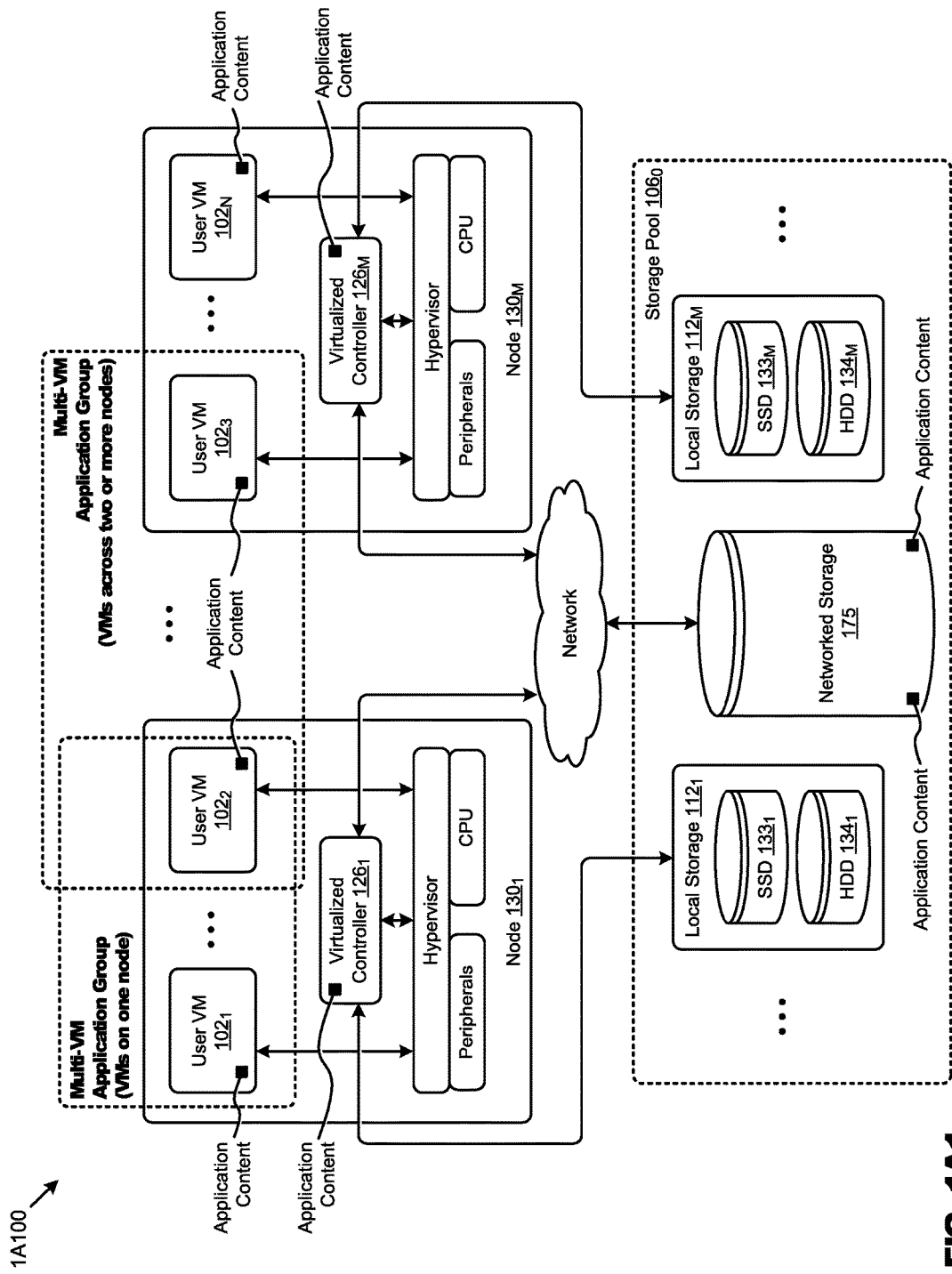
FIG. 1A1

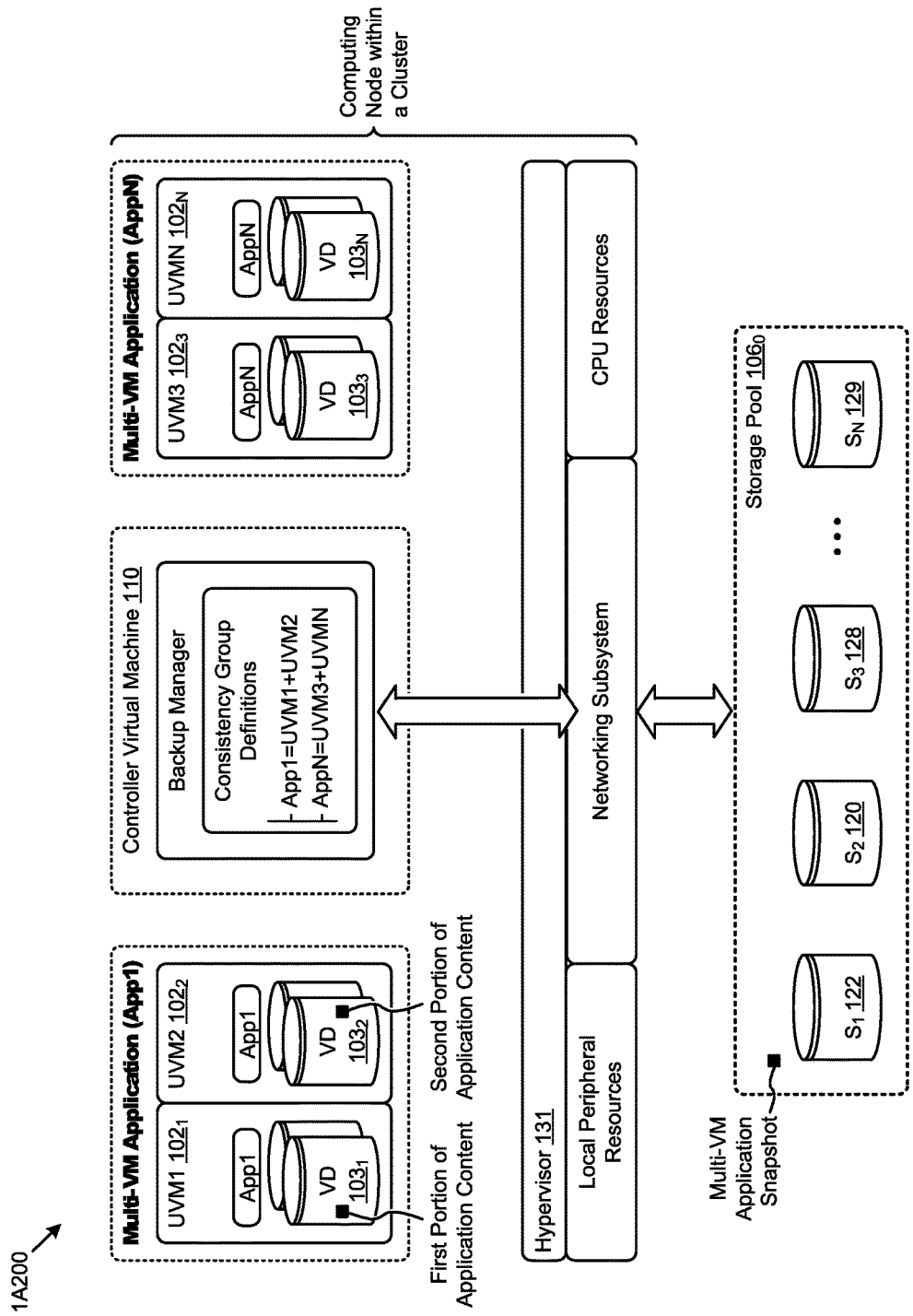
FIG. 1A2

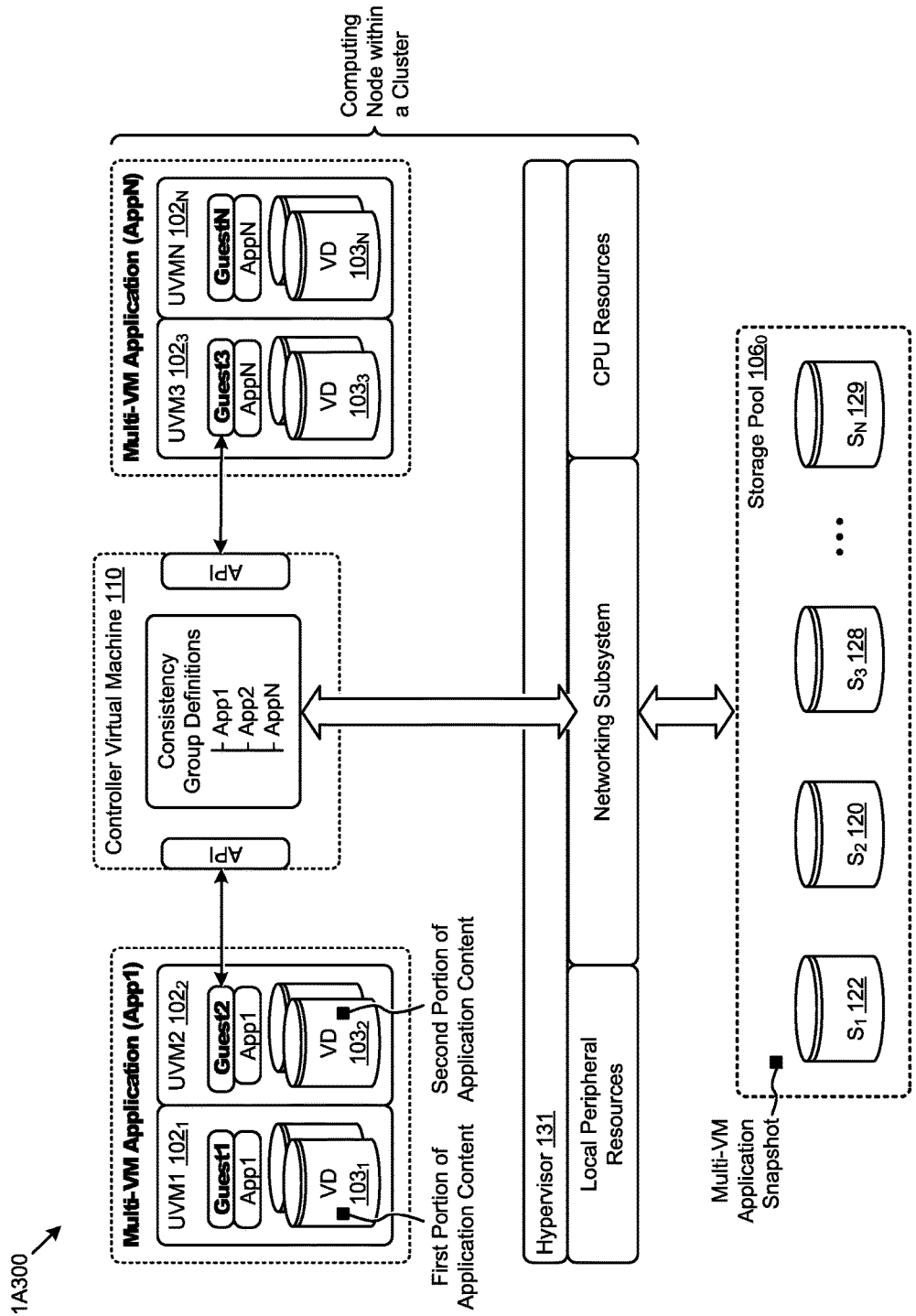
FIG. 1A3

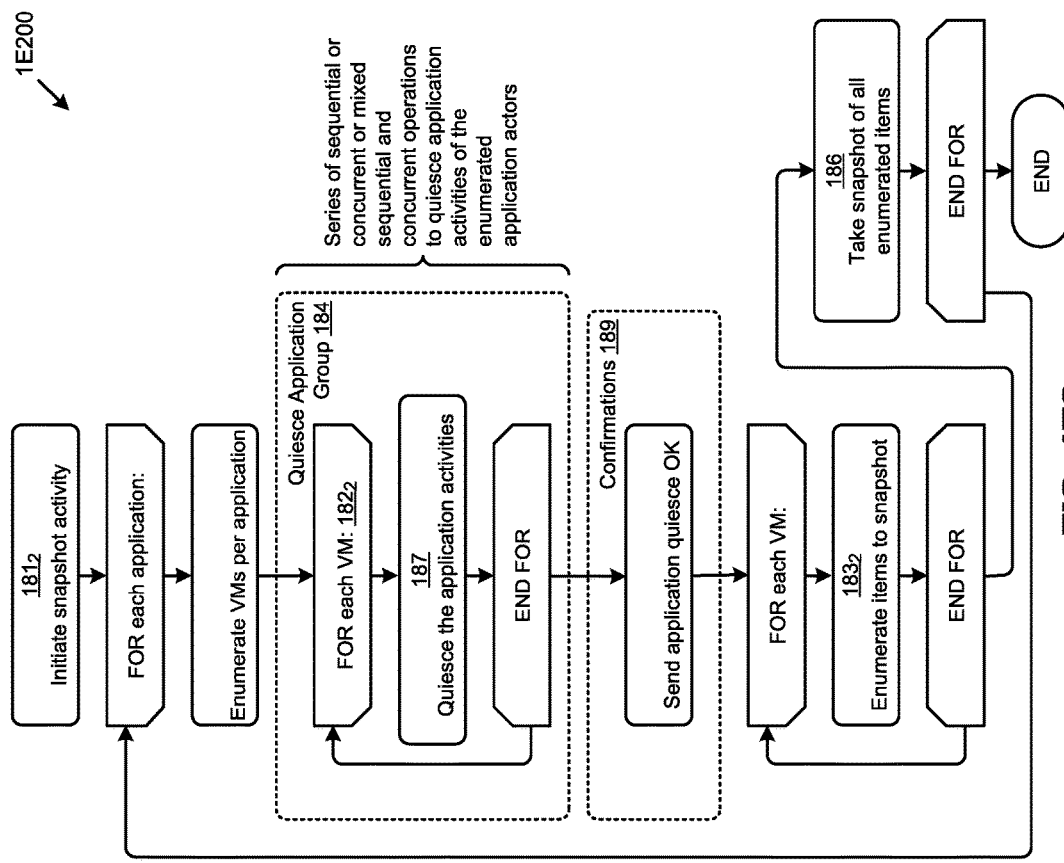
FIG. 1E2
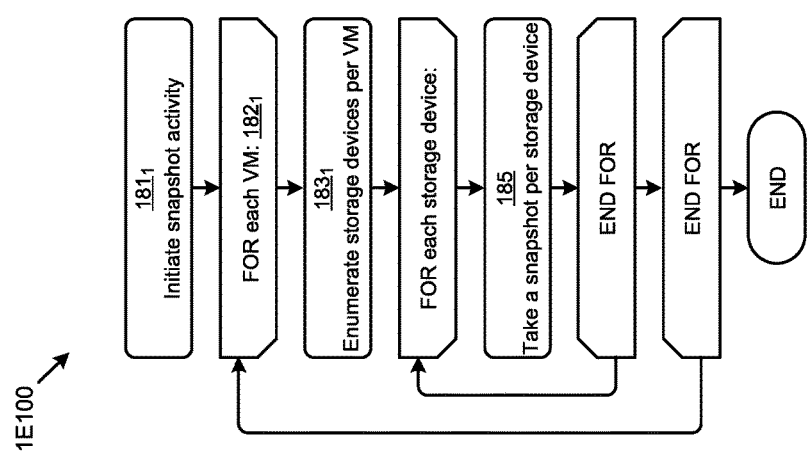
FIG. 1E1

SAVING AND RESTORING STORAGE DEVICES USING APPLICATION-CONSISTENT SNAPSHOTS

FIELD

This disclosure relates to disaster recovery techniques, and more particularly to techniques for saving and restoring storage devices using application-consistent snapshots.

BACKGROUND

In many computing environments, virtual machines (VMs) are used to implement services and applications. In many cases multiple virtual machines are used to implement a single application, for example when the application is configured to balance a workload over multiple virtual machines, and/or when the application is configured into a single master and multiple slave regimes. Virtual machine hypervisors can sometimes be employed to access storage devices (e.g., real storage devices or areas, or virtual storage devices) so as to assist in the implementation of a disaster recovery plan.

Unfortunately, virtual machine hypervisors do not provide methods to take application-consistent snapshots when multiple VMs are used to implement a single application. This situation gives rise to the potential for extremely deleterious effects, such as in cases when two or more virtual machines involved in a single application share some data space (e.g., a shared data structure). Unless all reader/writer virtual machines in the application are in an application-wide consistent state, a snapshotted data structure can be in a state of corruption at the time the snapshot is taken. This can have the effect that a computing environment that is restored from a corrupted snapshot might not function as intended, or might not function at all, or even might cause damage to data. Disaster recovery plans need is a way to bring a group of multiple virtual machines into a consistent state before taking snapshots of the storage devices that are used by an application.

What is needed is a technique or techniques to improve over legacy and/or over other considered approaches. Some of the approaches described in this background section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

The present disclosure provides a detailed description of techniques used in systems, methods, and in computer program products for saving and restoring storage devices using application-consistent snapshots, which techniques advance the relevant technologies to address technological issues with legacy approaches. More specifically, the present disclosure provides a detailed description of techniques used in systems, methods, and in computer program products for saving and restoring storage devices using application-consistent snapshots. Certain embodiments are directed to technological solutions for deployment of agents throughout multi-cluster environments where the agents coordinate multiple virtual machines to reach a known-consistent state, which embodiments advance the relevant technical fields as well as advancing peripheral technical fields.

The disclosed embodiments modify and improve over legacy approaches. In particular, the herein-disclosed techniques provide technical solutions that address the technical problems attendant to generating application-consistent storage backup snapshots when multiple virtual machines are used to implement an application. Such technical solutions serve to reduce the demand for computer memory, reduce the demand for computer processing power, and reduce the demand for inter-component communication. Some embodiments disclosed herein use techniques to improve the functioning of multiple systems within the disclosed environments, and some embodiments advance peripheral technical fields as well. As one specific example, use of the disclosed techniques and devices within the shown environments as depicted in the figures provide advances in the technical field of high-performance computing as well as advances in various technical fields related to distributed storage backup and recovery snapshotting.

Further details of aspects, objectives, and advantages of the technological embodiments are described herein and in the following descriptions, drawings, and claims.

BRIEF DESCRIPTION OF THE DRAWINGS

The drawings described below are for illustration purposes only. The drawings are not intended to limit the scope of the present disclosure.

FIG. 1A1 exemplifies an environment in which techniques for generating application-consistent snapshots can be performed.

FIG. 1A2 depicts backup manager coordination so as to implement saving and restoring of storage devices using application-consistent snapshots, according to an embodiment.

FIG. 1A3 depicts controller virtual machine coordination so as to implement techniques for generating application-consistent snapshots can be performed, according to an embodiment.

FIG. 1E1 presents a flowchart for comparison of techniques used for saving and restoring storage devices using application-consistent snapshots, according to an embodiment.

FIG. 1E2 presents a flowchart for comparison of techniques used for saving and restoring storage devices using application-consistent snapshots, according to an embodiment.

FIG. 2 depicts a flowchart showing an application consistency group formation approach as used when generating application-consistent snapshots, according to an embodiment.

FIG. 3 depicts a flowchart showing a recovery approach as used when restoring from application-consistent snapshots, according to an embodiment.

DETAILED DESCRIPTION

Figure 1B:
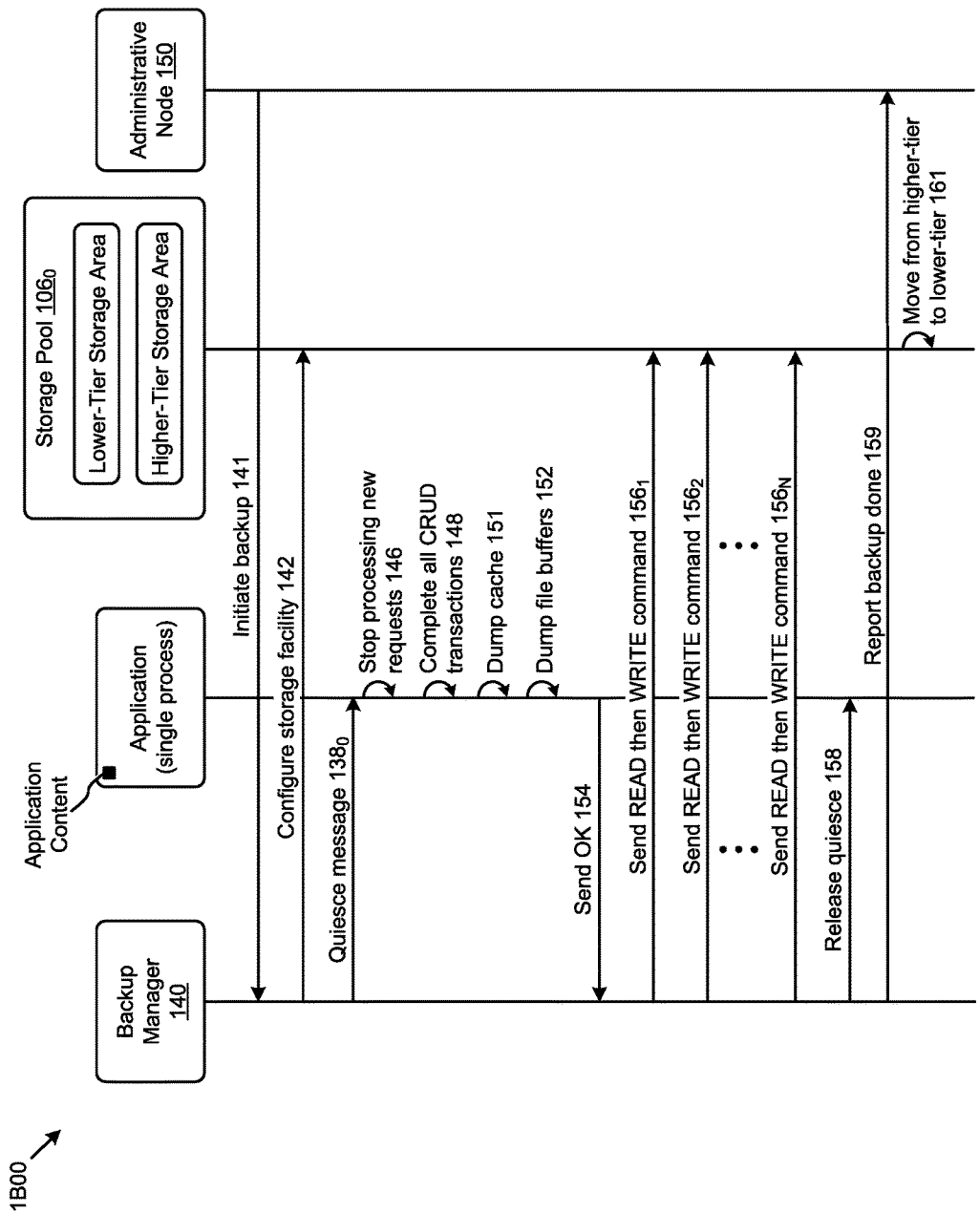
FIG. 1B depicts a single process quiesce protocol as used for saving and restoring storage devices using application-consistent snapshots, according to an embodiment.

Some embodiments of the present disclosure address the problem of generating application-consistent storage backup snapshots when multiple virtual machines are used to implement an application and some embodiments are directed to approaches for deployment of agents throughout multi-cluster environments where the agents coordinate multiple virtual machines to reach a known consistent state. More particularly, disclosed herein and in the accompanying figures are exemplary environments, systems, methods, and computer program products for saving and restoring storage devices using application-consistent snapshots.

Overview

Some embodiments of the present disclosure address the problem of generating backup snapshots that cover cases of multiple virtual machines (VMs) that operate in a multi-node distributed computing environment (e.g., in clusters). In multi-node distributed computing environments (e.g., geographically distributed computing clusters) multiple virtual machines may write to the same storage volume one or more agents that serve to coordinate among the multiple virtual machines so as to initiate and complete the processes to generate an application-consistent snapshot.

In one embodiment, a backup manager or agent issues commands to intra-VM quiescing agents (QAs). Each of the VMs that comprise an application can be identified as belonging to an application consistency group. For example, a set of VMs (e.g., $VM_A$, $VM_B$, $VM_N$) can be grouped into an application consistency group, and commands (e.g., agent-issued commands or any other sorts of quiesce commands) can be issued to each VM in the group. The commands issued by the backup manager or agent serve to initiate quiescence of all of the VMs that belong to the application consistency group.

Response to such commands include actions taken by the intra-VM quiescing agents and/or actions taken by any transaction processors within or managed by any one or more of the application VMs. In many cases, the QAs will quiesce the file system operations being performed by the VM. In some cases the QAs can be function-specific (for example, for interfacing with a database server or an email server) and can, in some cases, manage messaging using a lease timeout. In such cases, a process or thread renews the lease periodically (e.g., to prevent the VM from being quiesced forever). When the quiesced VMs have completed their transactions (e.g., file and/or database I/O), the QAs will deem the application as being quiesced and inform a backup manager (e.g., through a representational state transfer (REST) application programming interface (API)) of such a quiesced state. Upon the event that all QAs report a quiescent state, a snapshot of all storage devices can be taken. The resulting application-consistent snapshot can be saved for later use (e.g., a restore) in a disaster recovery plan. The backup manager issues unquiesce commands to the VMs of the application consistency group and the application continues processing. The storage devices can be real storage devices or can be logical storage devices, and any two or more storage devices can be distributed over multiple geographies and/or over multiple subnets and/or over multiple storage arrays.

Various embodiments are described herein with reference to the figures. It should be noted that the figures are not necessarily drawn to scale and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment. An aspect or an advantage described in conjunction with a particular embodiment is not necessarily limited to that embodiment and can be practiced in any other embodiments even if not so illustrated. Also, references throughout this specification to "some embodiments" or "other embodiments" refers to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments.

Definitions

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Reference is now made in detail to certain embodiments. The disclosed embodiments are not intended to be limiting of the claims.

Descriptions of Exemplary Embodiments

FIG. 1A1 exemplifies an environment 1A100 in which techniques for generating application-consistent snapshots can be performed. As an option, one or more variations of environment 1A100 or any aspect thereof may be implemented in the context of the architecture and functionality of the embodiments described herein. The environment 1A100 or any aspect thereof may be implemented in any environment.

FIG. 1A1 shows computing nodes (e.g., node $130_1$, node $130_M$) that are composed of real hardware components. Any number of single computing nodes can be organized into an array or cluster of nodes. Any node within a cluster of nodes can access storage devices in storage pool $106_0$ using any combinations of local storage access (e.g., local storage $112_1$ and local storage $112_M$) and/or node-specific networking subsystem functions to access the storage pool $106_0$, through the shown network, to access the networked storage 175. The local storage in the storage pool can be local storage comprising solid-state storage devices (SSDs) (e.g., SSD $133_1$, SSD $133_M$) and/or can be hard drive storage devices (HDDs) (e.g., HDD $134_1$, HDD $134_M$), or combinations. A user virtual machine (e.g., user VM $102_1$, user VM $102_2$, user VM $102_3$, . . . , user VM $102_N$) can access any of the foregoing devices of the storage pool through a virtualized storage controller (e.g., virtualized controller $126_1$, virtualized controller $126_M$).

The environment 1A100 shown in FIG. 1A1 is exemplary of computing platforms that form virtualized computers (e.g., virtual machines, VMs). As shown, a plurality of user virtual machines (e.g., user VM $102_1$, user VM $102_2$, user VM $102_3$, . . . , user VM $102_N$) that execute on top of a hypervisor. The hypervisor abstracts node-specific computing hardware (e.g., the shown CPU, peripherals, etc.) to provide an abstracted or virtual view of said computing hardware to the user virtual machines.

Any one or more user VMs can be configured to perform some function or application. For example, a single user VM might be configured to serve as a "Windows 10 desktop" in a virtualized system. Alternatively, two or more user VMs might be configured to each perform respective aspects of an application. For example, a first user VM might be configured to collect a set of data, and other user VMs might be configured to operate over the collected data. The collected set of data might be partitioned such that multiple user VMs operate over respective subsets of the set of data collected by the first user VM. In performing an application, any user VM can receive and/or store and/or generate application content. Such application content can be sent to the storage pool (e.g., through a virtualized controller that performs storage I/O to and from the storage pool).

In some cases, an application is performed using a single user VM. In some cases, an application is performed by two or more user VMs that operate in a single node, and in some cases an application is performed by two or more user VMs that operate on two or more different nodes.

The application content may derive from any source, possibly deriving from operation of one or more applications (e.g., enterprise applications, mission-critical applications, etc.). Such content may need to be backed-up for resilience of the system and/or as a part of a disaster recovery plan. In some cases, a backup manager is employed to perform backup operations from time to time, possibly on a backup schedule. Such a backup manager and techniques for coordination of a backup among a plurality of VMs is shown and discussed as pertains to FIG. 1A2.

Figure 2:
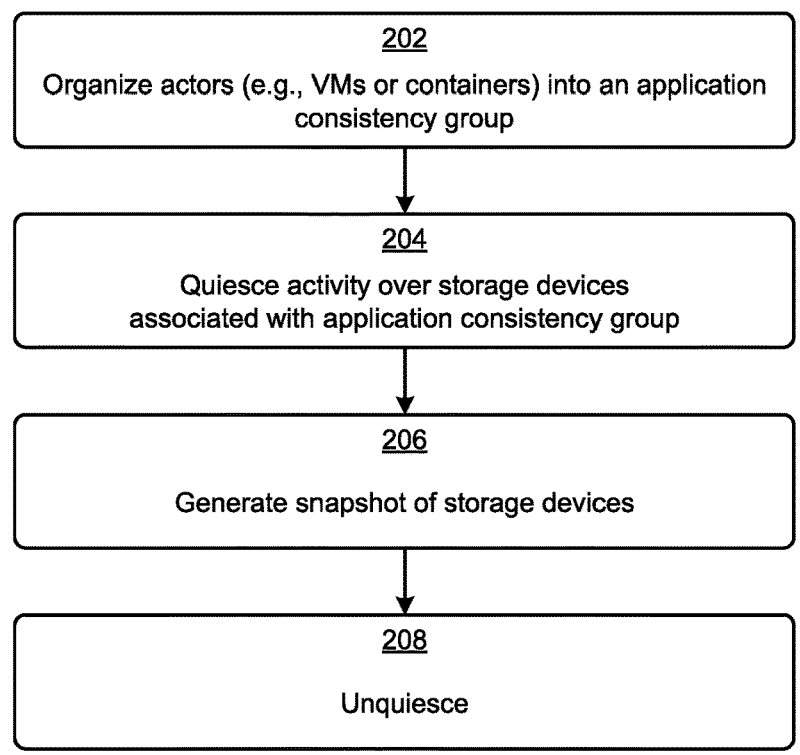

FIG. 1A2 depicts backup manager coordination 1A200 so as to implement saving and restoring of data on storage devices using application-consistent snapshots. As an option, one or more variations of backup manager coordination 1A200 or any aspect thereof may be implemented in the context of the architecture and functionality of the embodiments described herein. The backup manager coordination 1A200 or any aspect thereof may be implemented in any environment.

Any user VM might allocate one or more virtual disks (e.g., VD $103_1$, VD $103_2$, VD $103_3$, . . . , VD $103_N$). In some cases, a particular user VM might self-allocate any number of virtual disks, and in some cases (e.g., when two or more user VMs implement a single application) two or more virtual machines might share access to a single particular virtual disk. Any combination of any of the foregoing computing elements can be used to form a computing node (as shown), which in turn can access the storage pool $106_0$. Such a storage subsystem pool may comprise any number of storage areas (e.g., $S_1$ 122, $S_2$ 120, $S_3$ 128, . . . , $S_N$ 129, etc.). Content that may derive from or may be accessed by a user VM can be stored in one or more of the storage areas, which can include a series of blocks that combine to form materialized, non-volatile representations of the contents of the virtual disks.

According to the herein-disclosed techniques, before assembling a list of blocks that may be included in a point-in-time snapshot, the VMs that are part of an application group enter a quiescent state. Such a quiescent state can be reached by a VM after the VM performs some processing in response to a signal received from a backup manager. As shown, the backup manager can interface with any number of UVMs. Moreover, a backup manager can access blocks from any virtual disk and can interface with any storage device so as to materialize any content. A backup manager can determine blocks to be included in a snapshot. In some cases, a backup manager can facilitate flushing of content from any volatile location (e.g., from cache or from a virtual machine's in-memory data structures). As one example, a backup manager can issue commands to the VMs of an application group and the constituent VMs can perform respective flushing of data from volatile storage areas. The flushing serves to save data stored in volatile areas to non-volatile areas (e.g., in the storage pool $106_0$).

In some embodiments, a backup manager can be implemented in whole or in part as a virtualized controller. A virtualized controller can take the form of a virtual machine (e.g., running in conjunction with a hypervisor 131) or can take the form of a container (e.g., a Docker container that does not directly rely on hypervisor services). In either or any case, the aforementioned commands to quiesce VMs in an application group can be sent from such a virtualized controller (as shown) to one or more instances of a user virtualized computer, which also can take the form of a virtual machine (e.g., a user VM running in conjunction with a hypervisor) or can take the form of a container (e.g., a Docker container that does not directly rely on hypervisor services).

A backup manager can be configured to take snapshots (e.g., a point-in-time snapshot, an application-consistent snapshot, a multi-VM application snapshot, etc.). Such a backup manager retains or has access to a set of consistency group definitions. For example, and as shown, the application heretofore referred to as "App1" is carried out by a particular group of UVMs, namely UVM1 $102_1$ and UVM2 $102_2$. The application heretofore referred to as "AppN" is carried out by a particular group of UVMs, namely UVM3 $102_3$ and UVMN $102_N$. As such, any number of user machines (e.g., user VMs, user containers, etc.) can be brought into the definition of an application consistency group. The set of user machines that are identified to be within a consistency group can be codified into a consistency group definition. The identified user machines can be hosted on a single node (e.g., see the App1 and AppN examples of FIG. 1A2) or can be distributed across a set of nodes (e.g., see the multi-VM application group across two or more nodes as depicted in FIG. 1A1). Moreover a single application can be implemented wholly within a single user virtual machine, or can be distributed across a plurality of virtual machines.

As shown in FIG. 1A2, each user virtual machine (UVM) implements a respective portion of an application (e.g., UVM $102_1$ implements a first portion of App1, UVM $102_2$ implements a second portion of App1, UVM $102_3$ implements a first portion AppN, etc.). A single application can use multiple virtualized computers (e.g., UVMs) to accomplish the processing of a particular application. Moreover, a virtualized controller can subsume and/or cooperate with a backup manager to send one or more quiesce requests to any or all of the user virtual machines (UVMs) that are associated with a particular application. An application programming interface (API) to facilitate communication between a virtualized controller and user virtual machines is shown and described as pertains to FIG. 1A3.

Figure 3:
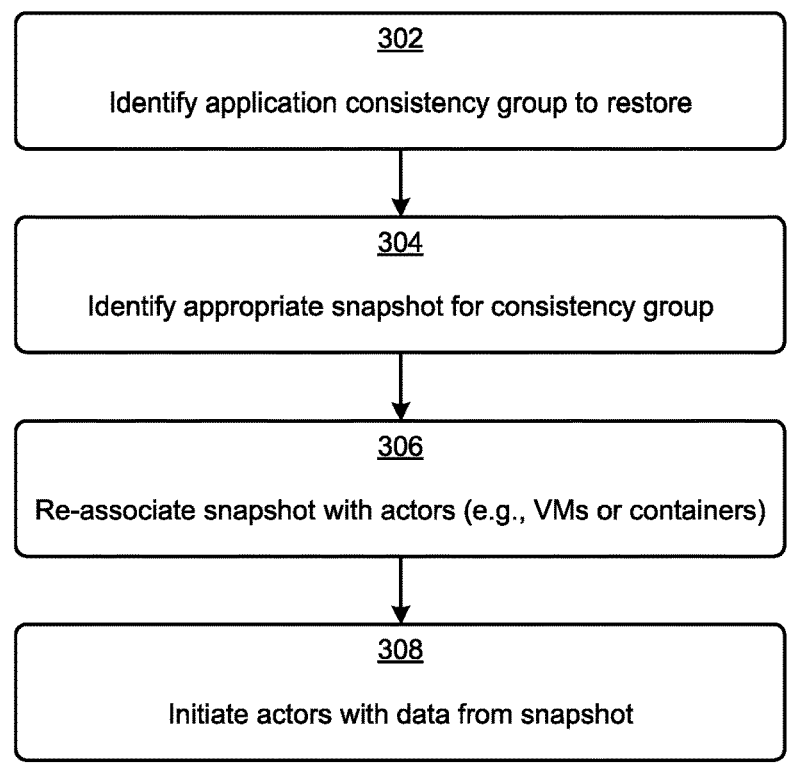

FIG. 1A3 depicts controller virtual machine coordination 1A300 so as to implement techniques for generating application-consistent snapshots can be performed. As an option, one or more variations of controller virtual machine coordination 1A300 or any aspect thereof may be implemented in the context of the architecture and functionality of the embodiments described herein. The controller virtual machine coordination 1A300 or any aspect thereof may be implemented in any environment.

The embodiment shown in FIG. 1A3 is merely one example architecture that uses a guest module within a user virtual machine. Such a guest module (e.g., guest1, guest2, guest3, . . . , guestN) can receive commands from a controller virtual machine 110 and can further communicate with the controller virtual machine using the shown application programming interfaces (APIs). Some possible interactions between components are given in the following FIG. 1B (e.g., pertaining to quiescing a single process) and FIG. 1C (e.g., pertaining to quiescing multiple processes).

FIG. 1B depicts a single process quiesce protocol 1B00 as used for saving and restoring storage devices using application-consistent snapshots. As an option, one or more variations of single process quiesce protocol 1B00 or any aspect thereof may be implemented in the context of the architecture and functionality of the embodiments described herein. The single process quiesce protocol 1B00 or any aspect thereof may be implemented in any environment.

As shown, the single process quiesce protocol 1B00 commences when an administrative node 150 sends a backup initiation signal to the backup manager 140 (message 141). The backup manager in turn configures some portion of the storage pool $106_0$. For example, the backup manager might configure a portion of the storage facility (message 142) to accept a stream of blocks and to store them in storage areas (e.g., $S_1$ 122, $S_2$ 120, $S_3$ 128, . . . , $S_N$ 129, etc.) that are accessible via the aforementioned storage access layer. In the example shown, an application is implemented using just a single process. The backup manager or other agent (e.g., a controller virtual machine or a container running a process) sends a quiesce message (message $138_0$) to the virtual machine running the application, and the virtual machine in turn stops processing new incoming transactions (operation 146); completes currently in-process transactions (operation 148) such as any create, read, update, and/or delete (CRUD) transactions; dumps cache (operation 151) to be sure that the last bits of to-be-written data are written to persistent storage areas; and dumps any file buffers (operation 152) to be sure that any file metadata is updated.

The virtual machine then sends an "OK" message (message 154), which message can serve as a signal for the backup manager to begin iterating through the blocks comprising the application snapshot by issuing READ and WRITE commands to the storage subsystem (message $156_1$, message $156_2$, . . . , message $156_N$, etc.). At some point, the backup manager deems that the snapshot blocks have been written, and the application can be released from its quiesced state (message 158). Completion of the snapshotting operations can be signaled to the administrative node (message 159). Any blocks that have been written to a higher-tier storage facility (e.g., cache or solid-state storage devices) can be copied or moved to a lower-tier storage device (operation 161). In some cases the entire set of blocks in a snapshotting operation are written only to a higher-tier (e.g., faster) area of the storage facility before unquiesce operations. The blocks that have been written to a higher-tier storage facility can be copied or moved to a lower-tier storage device after unquiescing components of the application (operation 161).

The foregoing generates an application-consistent snapshot, at least to the extent that all data pertaining to transactions and/or all data structures that might be saved to persistent memory have indeed been saved before the snapshot activities commence to read and write data. In some cases, a single application is implemented using a plurality of processes, and all such processes in the same application should be quiesced before taking an application-consistent snapshot.

Figure 1C:
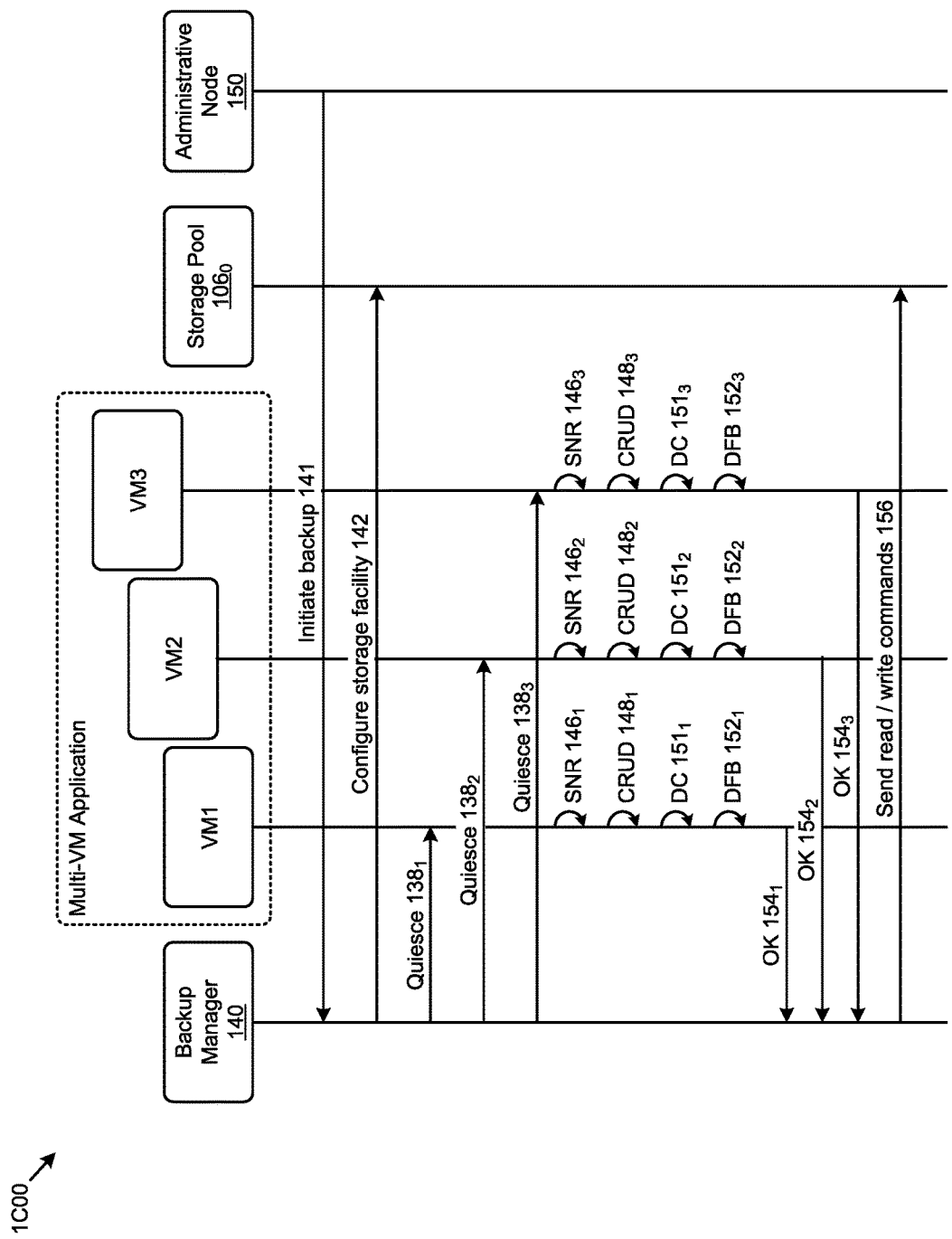
FIG. 1C depicts a multiple virtual machine quiesce protocol as used for saving and restoring storage devices using application-consistent snapshots, according to an embodiment.

FIG. 1C depicts a multiple virtual machine quiesce protocol 1C00 as used for saving and restoring storage devices using application-consistent snapshots. As an option, one or more variations of multiple virtual machine quiesce protocol 1C00 or any aspect thereof may be implemented in the context of the architecture and functionality of the embodiments described herein. The multiple virtual machine quiesce protocol 1C00 or any aspect thereof may be implemented in any environment.

As shown, the multiple virtual machine quiesce protocol 1C00 commences when an administrative node 150 sends a backup initiation signal to the backup manager 140 (message 141). The backup manager in turn configures some portion of the storage pool $106_0$ (message 142). The shown multi-VM application subsumes multiple VMs, specifically VM1, VM2, and VM3. The backup manager sends a quiesce message to each VM (message $138_1$, message $138_2$, and message $138_3$). Each of the VMs will respond to the quiesce request by stopping receiving new requests for transactions (e.g., see SNR $146_1$, SNR $146_2$, and SNR $146_3$), followed by completing all in-process CRUD operations (e.g., see CRUD $148_1$, CRUD $148_2$, and CRUD $148_3$), followed by dumping respective cache areas (e.g., see DC $151_1$, DC $151_2$, and DC $151_3$), and dumping file buffers (e.g., see DFB $152_1$, DFB $152_2$, and DFB $152_3$) to storage in the storage pool $106_0$. When each of the quiesced VMs has completed its respective quiesce operations, then each VM sends an OK message (e.g., see OK $154_1$, OK $154_2$, and OK $154_3$) to the backup manager. The backup manager then commences READ and WRITE operations by sending messages to the storage subsystem (message 156).

Figure 1D:
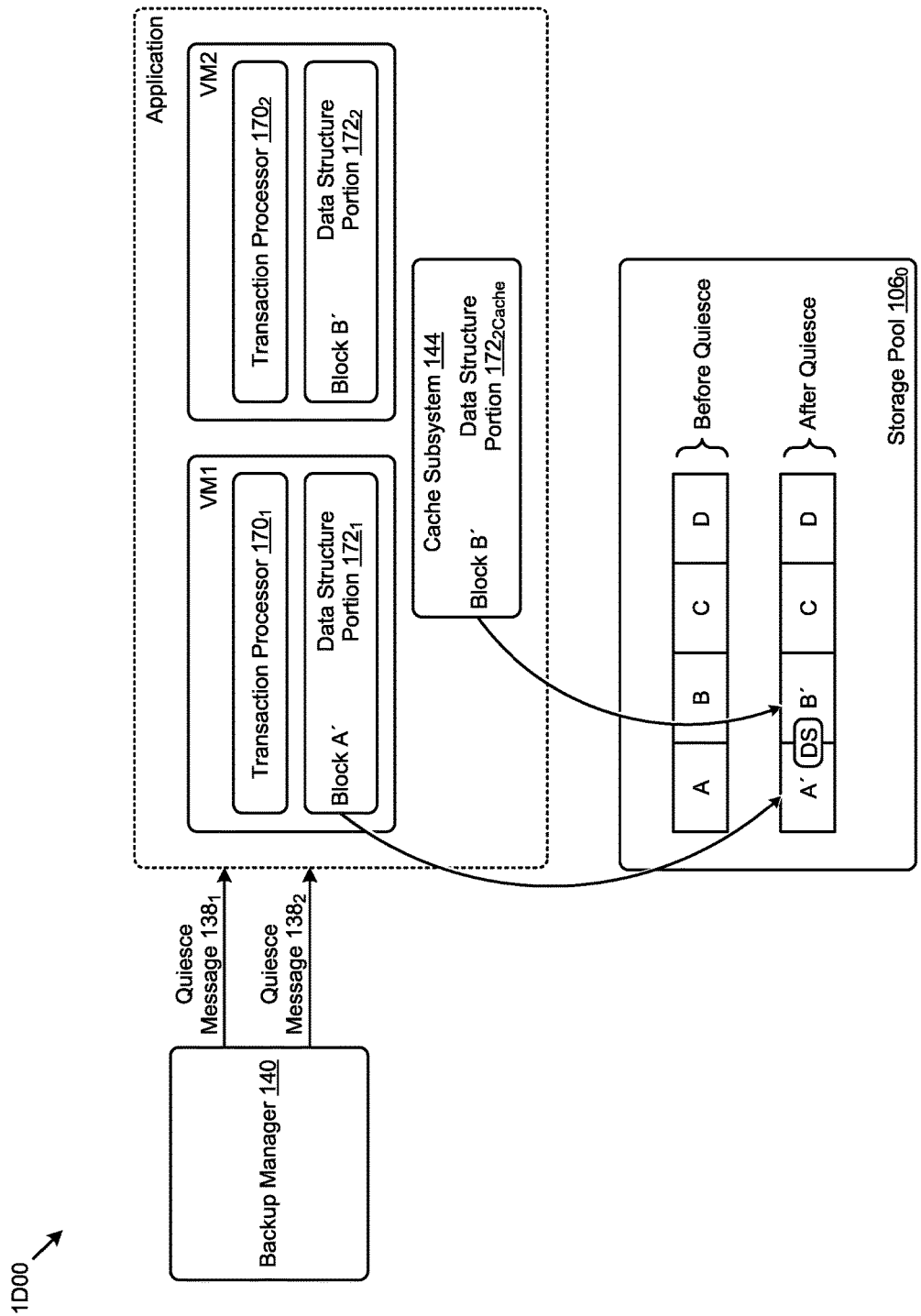
FIG. 1D is a schematic showing a data structure that is shared by two or more virtual machines.

FIG. 1D is a schematic 1D00 showing a data structure that is shared by two or more virtual machines. As an option, one or more variations of the embodiments shown in schematic 1D00 or any aspect thereof may be implemented in the context of the architecture and functionality of the embodiments described herein. The embodiments shown in schematic 1D00 or any aspect thereof may be implemented in any environment.

The schematic shows a specific embodiment where an application is implemented using two virtual machines (e.g., VM1 and VM2). Each virtual machine has its respective transaction processor (e.g., transaction processor $170_1$ and transaction processor $170_2$), which access a cache subsystem 144. As shown, both VM1 and VM2 access (e.g., for READ and WRITE) portions of the data structure (e.g., data structure portion $172_1$ and data structure portion $172_2$). It is possible that the data structure might have internal references (e.g., memory pointers) that would need to be consistent, at least for purposes of recovery (see FIG. 3).

The backup subsystem (e.g., see backup manager 140) sends quiesce messages to each VM (message $138_1$ and message $138_2$). The VMs in turn conclude their transactions. Some agents (e.g., a VM or a backup manager or another agent) cause the cache subsystem to flush its data (e.g., to write "dirty" blocks). Before quiesce, a series of blocks A, B, C, D in storage pool $106_0$ might (or might not) be in an application-consistent state. However, after quiesce, and more particularly, after the VM-resident data and cache has been flushed (including a write of the data structure portion $172_{2Cache}$), the portions of the data structure are written to non-volatile areas in the storage subsystem. As shown block A becomes block A' and block B becomes block B'. Even in the case where a data structure spans multiple blocks, the data structure is written to non-volatile areas in the storage subsystem in an application-consistent state.

FIG. 1E1 presents a flowchart 1E100 for comparison of techniques used for saving and restoring storage devices using application-consistent snapshots. As an option, one or more variations of flowchart 1E100 or any aspect thereof may be implemented in the context of the architecture and functionality of the embodiments described herein. The flowchart 1E100 or any aspect thereof may be implemented in any environment.

The embodiment shown in FIG. 1E1 is merely one example for comparison. The flow of flowchart 1E100 begins when an agent initiates snapshot activity (step $181_1$). Then, for each VM in the cluster (step $182_1$) the storage devices used by that VM are enumerated (step $183_1$) and, for each such storage device, a snapshot is taken (step 185). This series of steps might (or might not) produce an application-consistent snapshot. In situations such as depicted, the aspect of whether or not the taken snapshots are application-consistent depends on the organization of the VM or VMs, their respective data structures or portions thereof, and the organization of the data structures. The flow of FIG. 1E1 can be extended to cover scenarios with multiple VMs as is depicted in the flow of FIG. 1E2.

FIG. 1E2 presents a flowchart 1E200 for comparison of techniques used for saving and restoring storage devices using application-consistent snapshots. As an option, one or more variations of flowchart 1E200 or any aspect thereof may be implemented in the context of the architecture and functionality of the embodiments described herein. The flowchart 1E200 or any aspect thereof may be implemented in any environment.

The flow of flowchart 1E200 begins when an agent initiates snapshot activity (step $181_2$). The applications running on the cluster (e.g., the applications running on the nodes that have access to the storage pool) are enumerated and, for each application, the virtual machines that implement that application (e.g., master VMs, slave VMs, etc.) are enumerated. For each VM in the application group (step $182_2$), an agent sends a signal to quiesce the application (step 187). When the set of VMs in the application group have been quiesced (see quiesce application group 184), and have acknowledged their respective quiescence (confirmations 189), then the application (e.g., as a group) is deemed to be in a quiesced state. Any two or more VMs in the application group can be quiesced sequentially, or can be quiesced in parallel. For example, the steps to quiesce application group 184 can be forked, and then joined upon receipt of the confirmations 189.

Again, for each VM in the application group, the devices (e.g., real or virtual storage devices or areas) are enumerated (step $183_2$) for inclusion in subsequent snapshot activities. Such snapshot activities can then commence (step 186). The foregoing loop can be repeated for each application.

FIG. 2 depicts a flowchart showing an application consistency group formation approach 200 as used when generating application-consistent snapshots. As an option, one or more variations of the application consistency group formation approach 200 or any aspect thereof may be implemented in the context of the architecture and functionality of the embodiments described herein. The application consistency group formation approach 200 or any aspect thereof may be implemented in any environment.

At step 202, some or all of the actors (e.g., tasks, processes, agents, VMs, containers) in the system are organized into an application consistency group. As noted above, there may be multiple applications in the system (e.g., with multiple application consistency groups in the system), where each application may include any number of actors.

Any suitable basis can be used to decide upon the members of an application consistency group. As just one example, the application consistency group can be organized to provide for data consistency across multiple VMs. This ensures, for example, that data dependencies and/or shared data structures that are accessed by multiple VMs do not result in inconsistencies after a disaster recovery. As another example, there may be recognition that a set of multiple VMs pertain to closely related users, data, hardware, and/or subject matter such that the VMs should be grouped together into a common application consistency group.

A set of metadata is maintained in the system to track the membership of actors that are considered to be within an application consistency group. In some embodiments, the application is structured as a container object that includes the identifier of the VMs and/or VM resources that are mapped to an application consistency group. In some embodiments, the application is structured as a VM that subsumes one or more containers that are mapped to an application consistency group. A container can subsume or link to a quiescing agent.

At step 204, activity is quiesced for each of the VMs associated with the application consistency group. A fork-join block is a common approach that is used to synchronize completion of quiescence; expiration of a timeout period is another approach. The aforementioned storage devices can persist for any object pertaining to a VM for which shared access is to be controlled. For example, the object can be a file, a record, an area of shared memory, or anything else that can be shared by multiple VMs and/or entities in the system.

Once the VMs in the application group have been quiesced, then at step 206, a snapshot is taken of the storage devices corresponding to the shared objects. The snapshot is a recording of the state of a storage device at a given moment in time. A snapshot is generated for every storage device associated with the VMs in an application consistency group that would be required in a disaster recovery situation to maintain data consistency across multiple VMs in the same group.

The snapshot is then stored in a storage location that is anticipated to not share a common failure modality with the members of the application consistency group. For example, a well-recognized failure mode in disaster scenarios is the failure of a power supply or power source. Therefore, given recognition of this possible failure scenario, it would make sense for the snapshot(s) of VMs for nodes attached to a first power supply or source to be stored in a storage location that is associated with a second power supply or source. Once the snapshots have been appropriately captured and are confirmed to be safely stored, the formerly quiesced VMs can be released at step 208.

Any suitable approach can be used to take a snapshot of a storage device. For example, consider the situation where the application and/or the VM has either an in-memory state or on-disk state that needs to be snapshotted. The in-memory and/or on-disk data for the application/VM might be stored in a set of one or more virtualized storage components. A copy of the data within the virtualized storage components is made and/or identified to perform the snapshot. To explain further, consider if the resources for the application are stored as virtual disks ("vDisks"), which are logical representations of storage space compiled from one or more physical underlying storage devices. A file comprises data within one or more vDisks that are associated with the file. Metadata may be used to map the vDisks to the underlying physical storage devices.

More information and approaches to implement virtual disks and any associated metadata is described in U.S. application Ser. No. 13/207,345, now issued as U.S. Pat. No. 8,601,473 and Ser. No. 13/207,357, now issued as U.S. Pat. No. 8,850,130, both filed on Aug. 10, 2011 and both of which are hereby incorporated by reference in their entirety.

In many vDisk scenarios, when taking a snapshot, a copy is made of the vDisks associated with a VM. Any suitable technique or path can be taken to make a copy of the vDisks. In some embodiments, a copy-on-write approach is taken to make a copy of a vDisk when a change is made to that vDisk, where the previous version of the vDisk is still maintained. Both the previous and new version of the vDisk(s) are associated with identifier numbers (e.g., "epoch" numbers) that can be used to distinguish between the different stored versions of the vDisks. For a given application consistency group, snapshots for the vDisks associated with that application consistency group would be taken at the same time, and therefore would be associated with the same epoch number.

In this way, any application can be snapshotted on an application-consistent basis by implementing the application using virtualized storage and then, after quiescing, snapshotting the virtual storage components associated with the application. This permits the application consistency groups to be established in a way that is non-intrusive to the application or its constituent VMs, and in which no special hooks are required in the application or VMs to ensure that a collection of VMs and their storage devices can be snapshotted such that they are consistent for the application group.

This approach also permits any application, even one without a native capacity for snapshots, to implement application consistency groups. To explain, consider an application that does not natively provide a capacity to implement snapshots, such as most modern non-database and/or non-disaster recovery applications. Most applications that are not themselves database management systems (DBMSs), or failure/disaster systems, only offer rudimentary capabilities to handle data without even the concept of point-in-time snapshots. The underlying storage for these applications can be implemented using a virtualization system (e.g., where the application/application node is virtualized as a virtual machine and/or where the application uses a virtualized storage infrastructure having virtual machines to manage its data). Using the above-described approach, application-consistent snapshots can then be taken of the data associated with the virtual machines that correspond to the application, even if the application code itself does not provide the ability to implement snapshots.

The actions of step 204, step 206, and step 208 can be taken at any appropriate time period, (e.g., on a regular basis as established by a system administrator taking into account the need to maintain up-to-date snapshots while balancing costs). Snapshots can also be taken on an ad hoc basis at other time periods as well.

FIG. 3 depicts a flowchart showing a recovery approach 300 as used when restoring from application-consistent snapshots. As an option, one or more variations of recovery approach 300 or any aspect thereof may be implemented in the context of the architecture and functionality of the embodiments described herein. The recovery approach 300 or any aspect thereof may be implemented in any environment.

At step 302, identification is made of an application consistency group that needs to be restored to implement disaster recovery. This may occur, for example, upon recognition of a disaster that has occurred which has brought down some or all of the VMs within an application consistency group.

At step 304, the appropriate snapshot(s) to be restored are identified for the application consistency group. In some embodiments, the snapshots are stored within a hidden directory. The hidden directory is searched for the snapshot (s) of interest or the application consistency group/VMs to be restored.

At step 306, the identified snapshot(s) are re-associated with new instances of VMs that are being restored to implement disaster recovery. For example, if the snapshots are stored in a hidden directory, then this step will move or copy the snapshots into a public namespace to be associated with the VMs that are being restored.

Thereafter, at step 308, the VMs in the application consistency group being restored are brought up using the data from the snapshot(s). The VMs within the application consistency group will be restored and brought up with characteristics such that the applications can start up with the assumption of known or assumed consistency in their restored states.

FIG. 4A, FIG. 4B, FIG. 4C, FIG. 4D and FIG. 4E depict use models as implemented in systems that save and restore storage device data using application-consistent snapshots. As an option, one or more variations of the use models or any aspect thereof may be implemented in the context of the architecture and functionality of the embodiments described herein. The use models or any aspect thereof may be implemented in any environment.

Figure 4A:
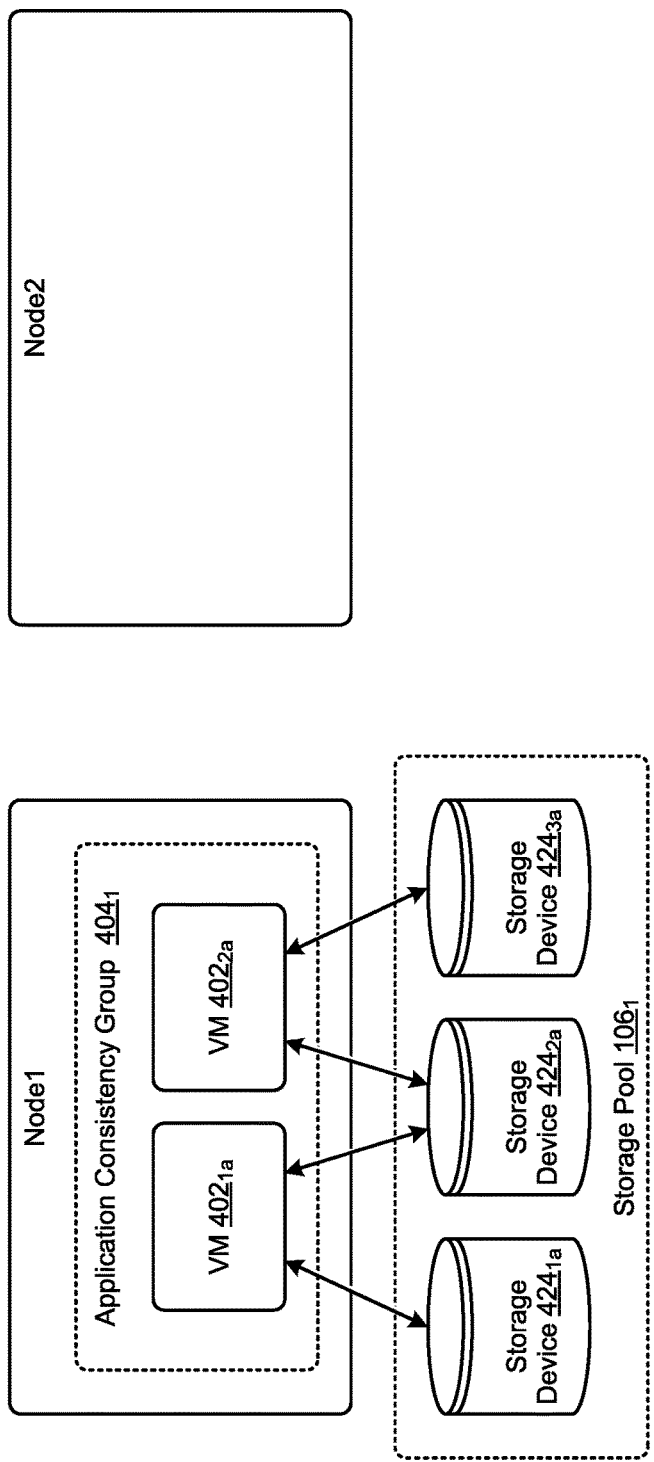
FIG. 4A, FIG. 4B, FIG. 4C, FIG. 4D and FIG. 4E depict use models as implemented in systems that save and restore storage device data using application-consistent snapshots, according to an embodiment.

FIG. 4A shows a first node (Node1) that is running VM $402_{1_a}$ and VM $402_{2_a}$, both of which are members of the same application consistency group $404_1$. These VMs (e.g., VM $402_{1_a}$ and VM $402_{2_a}$) are associated with storage devices (e.g., storage device $424_{1_a}$, storage device $424_{2_a}$, and storage device $424_{3_a}$ within storage pool $106_1$. As used herein, the term "node" refers to any appropriate computing entity and/or location, including without limitation, a machine, site, cluster, and/or system. One or more snapshots pertaining to the storage devices can be moved to a second node (Node2).

Figure 4B:
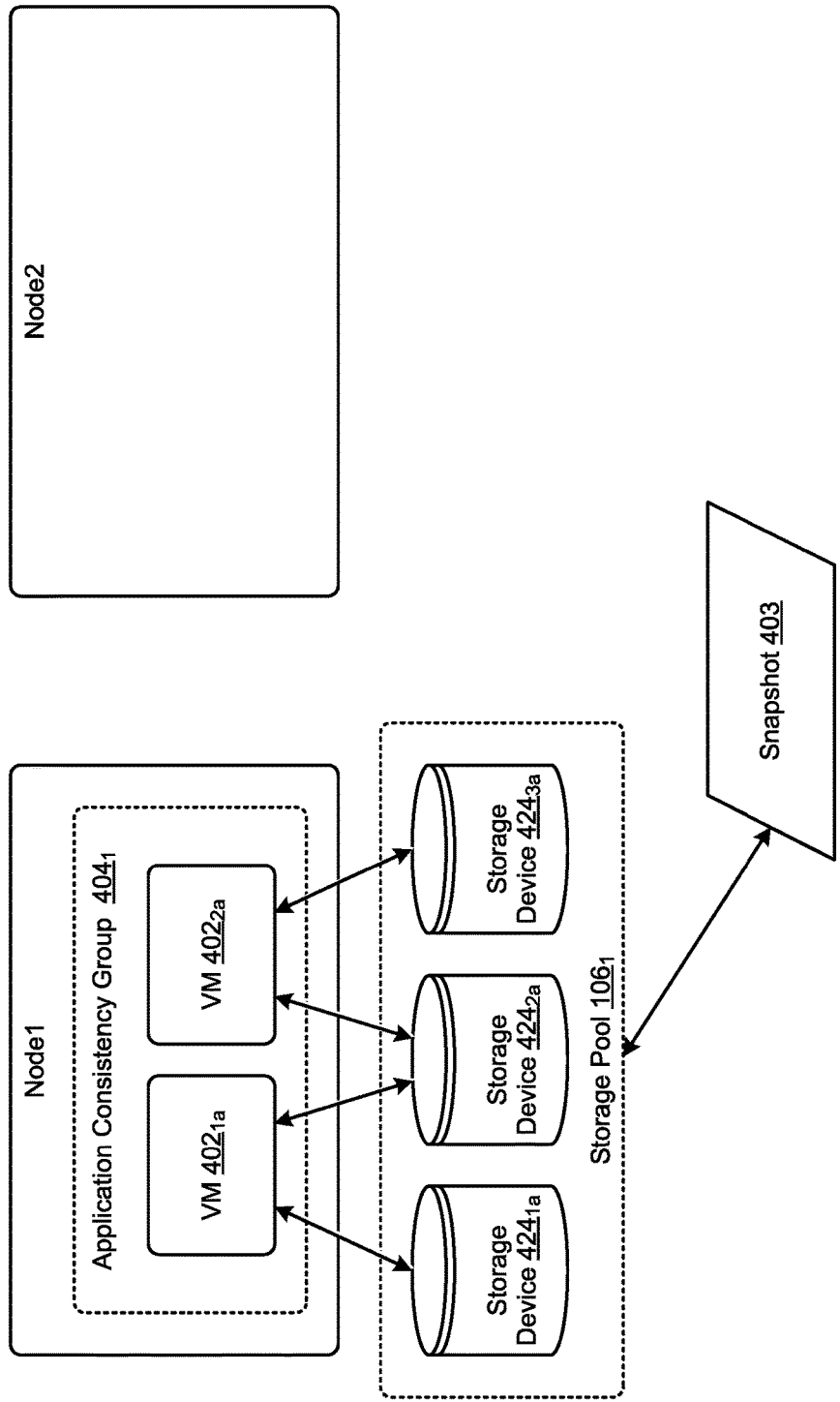

As illustrated in FIG. 4B, a snapshot 403 is taken of the storage devices. The snapshot 403 is taken to preserve an application-consistent state of the storage devices at a specific moment in time.

Figure 4C:
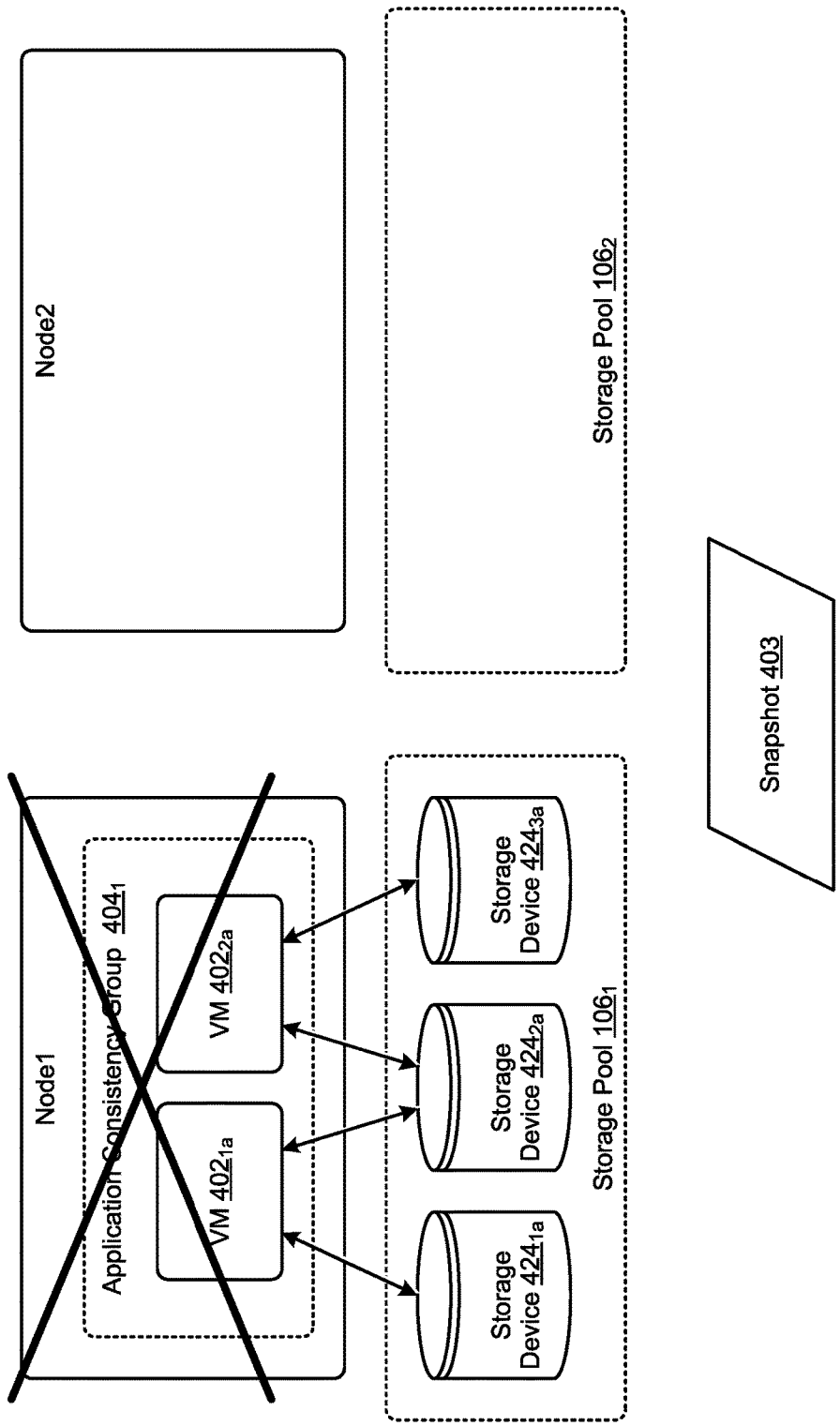

Thereafter, and as shown in FIG. 4C, it might happen that a disaster occurs that results in failure of components of the node comprising VM $402_{1a}$ and VM $402_{2a}$. Such a disaster may occur, for example, due to a hardware problem that takes down some of all of node1.

Disaster recovery is then pursued to bring VM $402_{1a}$ and VM $402_{2a}$ back up. Since these two VMs are members of the same application consistency group $404_1$, they are to be restored in a manner that preserves the application consistency of their restored states. As shown, the VMs are to be restored using Node2, and the storage pool $106_2$ that is associated with Node2 (as shown) during the disaster recovery process.

Figure 4D:
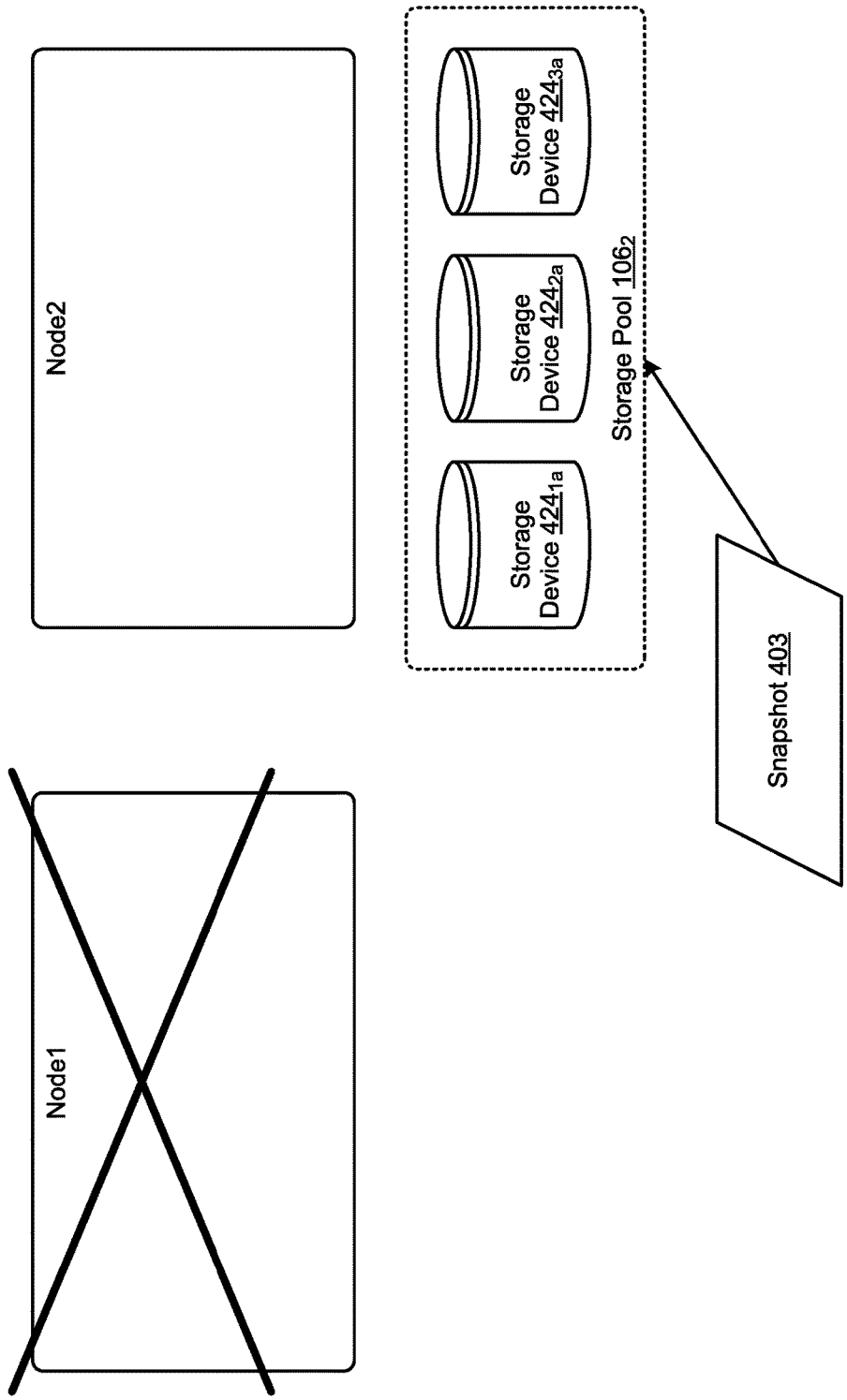

FIG. 4D illustrates identification of snapshot 403 as the appropriate snapshot to use when implementing the restoration of the application group of VMs. The snapshot 403 is associated with a restored set of storage devices (e.g., storage device $424_{1b}$, storage device $424_{2b}$, and storage device $424_{3b}$) that are accessible from the storage pool $106_2$.

Figure 4E:
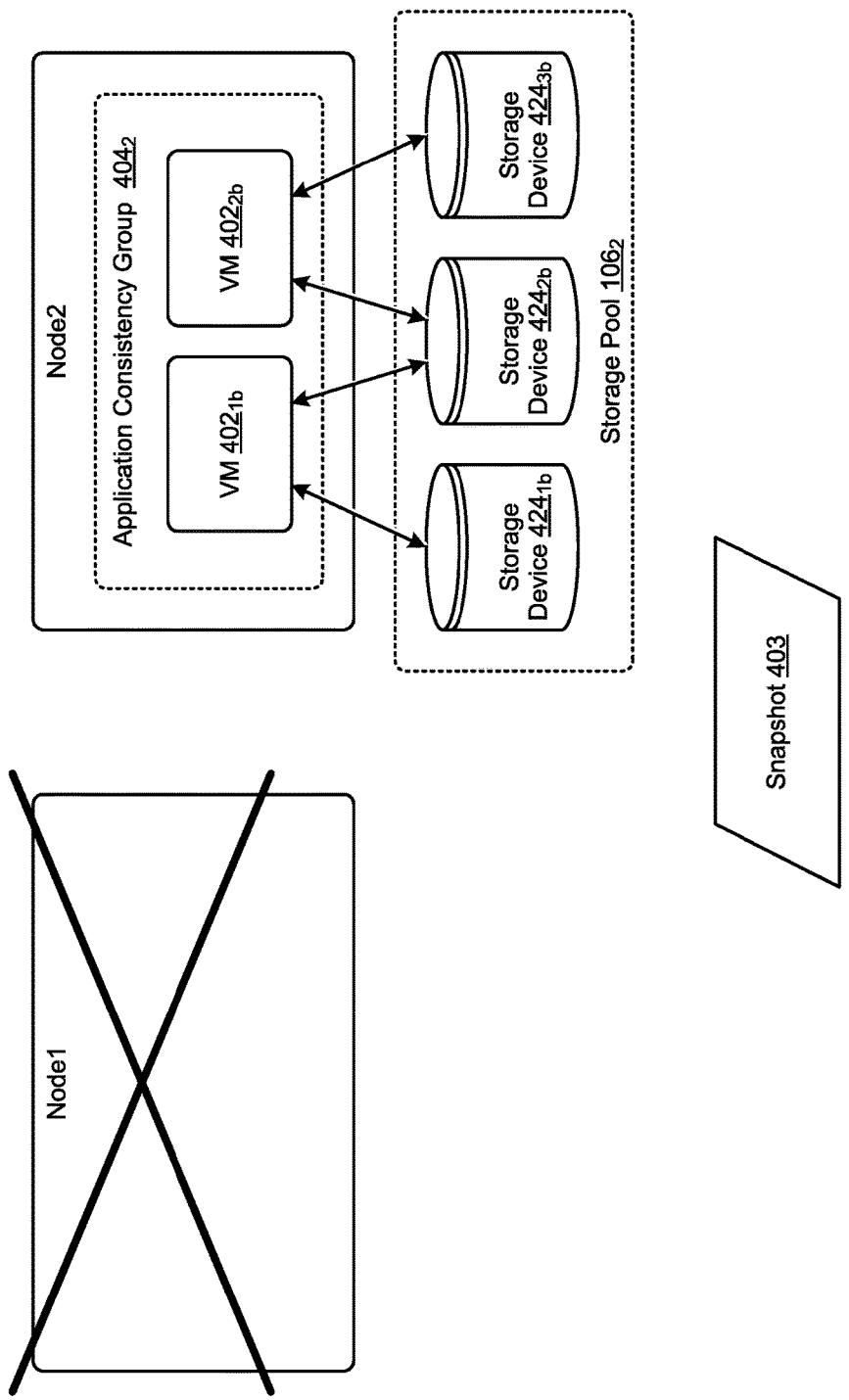

As illustrated in FIG. 4E, when VMs $402_{2a}$ and VM $402_{2b}$ are brought up in Node2, the state of the storage device $424_{1b}$, storage device $424_{2b}$, and storage device $424_{3b}$ in storage pool $106_2$ are in a consistent state as of the time that the snapshot 403 was captured in Node1. This means that the VM $402_{1b}$ and VM $402_{2b}$ within the restored application consistency group $404_2$ have been restored and brought up with application consistency in their restored states.

What has been described herein are approaches to implement disaster recovery for VMs, where application consistency groups are provided to link together two or more VMs for disaster recovery purposes.

Additional Embodiments of the Disclosure

Additional Practical Application Examples

Figure 5:
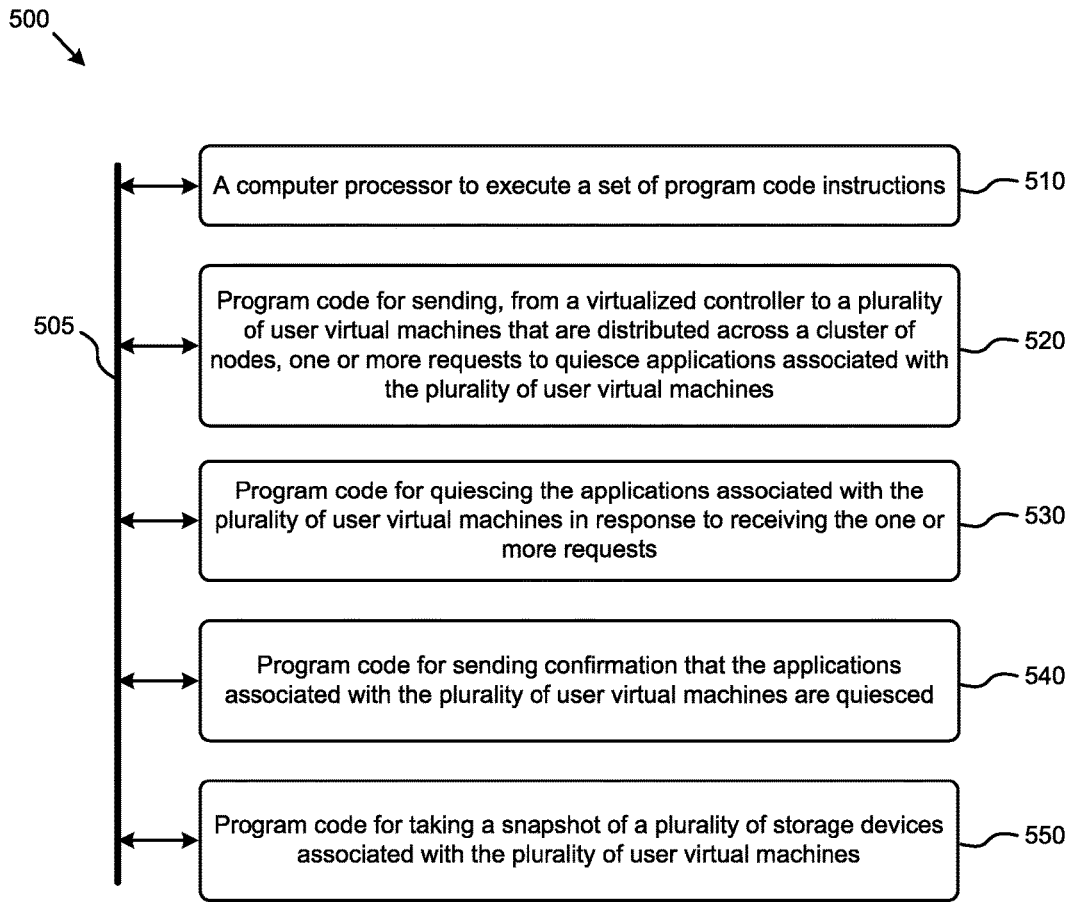
FIG. 5 depicts system components as arrangements of computing modules that are interconnected so as to implement certain of the herein-disclosed embodiments.

FIG. 5 depicts a system 500 as an arrangement of computing modules that are interconnected so as to operate cooperatively to implement certain of the herein-disclosed embodiments. The partitioning of system 500 is merely illustrative and other partitions are possible. FIG. 5 depicts a block diagram of a system to perform certain functions of a computer system. As an option, the system 500 may be implemented in the context of the architecture and functionality of the embodiments described herein. Of course, however, the system 500 or any operation therein may be carried out in any desired environment.

The system 500 comprises at least one processor and at least one memory, the memory serving to store program instructions corresponding to the operations of the system. As shown, an operation can be implemented in whole or in part using program instructions accessible by a module. The modules are connected to a communication path 505, and any operation can communicate with other operations over communication path 505. The modules of the system can, individually or in combination, perform method operations within system 500. Any operations performed within system 500 may be performed in any order unless as may be specified in the claims.

The shown embodiment implements a portion of a computer system, presented as system 500, comprising a computer processor to execute a set of program code instructions (module 510) and modules for accessing memory to hold program code instructions to perform: sending, from a virtualized controller to a plurality of user virtual machines that are distributed across a cluster of nodes, one or more requests to quiesce applications associated with the plurality of user virtual machines (module 520); quiescing the applications associated with the plurality of user virtual machines in response to receiving the one or more requests (module 530); sending confirmation that the applications associated with the plurality of user virtual machines are quiesced (module 540); and taking a snapshot of a plurality of storage devices associated with the plurality of user virtual machines (module 550).

Variations of the foregoing may include more or fewer of the foregoing modules and variations may perform more or fewer (or different) steps, and may use data elements in more or fewer (or different) operations. Strictly as one example, application-consistent snapshot can be used on one or more different clusters that are configured to bring up (e.g., in conjunction with application-consistent snapshot data) the application actors corresponding to an application group.

System Architecture Overview

Additional System Architecture Examples

Figure 6A:
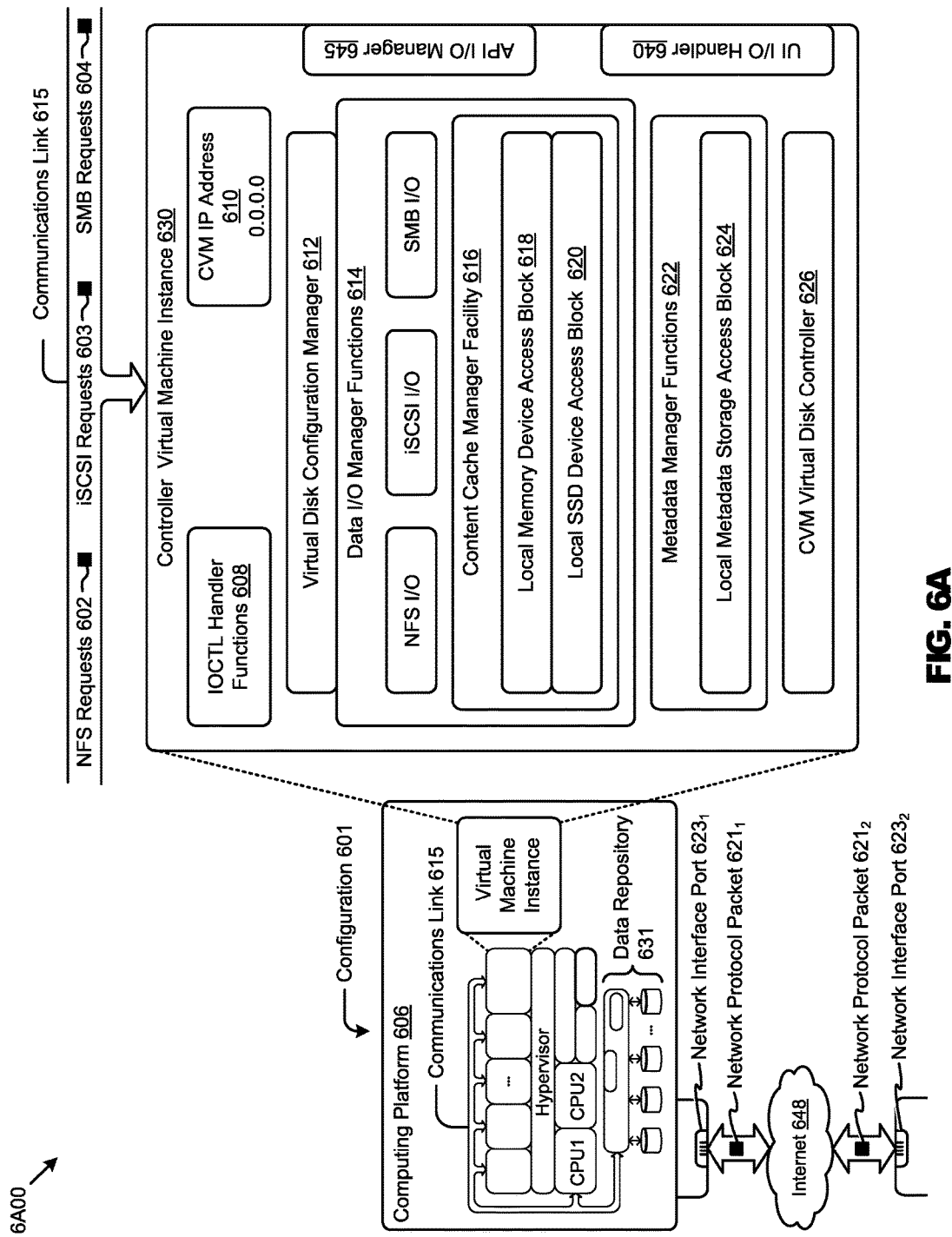
FIG. 6A and FIG. 6B depict architectures comprising collections of interconnected components suitable for implementing embodiments of the present disclosure and/or for use in the herein-described environments.

FIG. 6A depicts a virtual machine architecture 6A00 comprising a collection of interconnected components suitable for implementing embodiments of the present disclosure and/or for use in the herein-described environments. The shown virtual machine architecture 6A00 includes a virtual machine instance in a configuration 601 that is further described as pertaining to the controller virtual machine instance 630. A controller virtual machine instance receives block I/O (input/output or IO) storage requests as network file system (NFS) requests in the form of NFS requests 602, and/or internet small computer storage interface (iSCSI) block IO requests in the form of iSCSI requests 603, and/or Samba file system requests (SMB) in the form of SMB requests 604. The controller virtual machine instance publishes and responds to an internet protocol (IP) address (e.g., see CVM IP address 610. Various forms of input and output (I/O or IO) can be handled by one or more IO control handler functions (see IOCTL functions 608) that interface to other functions such as data IO manager functions 614, and/or metadata manager functions 622. As shown, the data IO manager functions can include communication with a virtual disk configuration manager 612, and/or can include direct or indirect communication with any of various block IO functions (e.g., NFS IO, iSCSI IO, SMB IO, etc.).

In addition to block IO functions, the configuration 601 supports IO of any form (e.g., block IO, streaming IO, packet-based IO, HTTP traffic, etc.) through either or both of a user interface (UI) handler such as UI IO handler 640 and/or through any of a range of application programming interfaces (APIs), possibly through the shown API IO manager 645.

The communications link 615 can be configured to transmit (e.g., send, receive, signal, etc.) any types of communications packets comprising any organization of data items. The data items can comprise a payload data area as well as a destination address (e.g., a destination IP address), a source address (e.g., a source IP address), and can include various packet processing techniques (e.g., tunneling), encodings (e.g., encryption), and/or formatting of bit fields into fixed-length blocks or into variable length fields used to populate the payload. In some cases, packet characteristics include a version identifier, a packet or payload length, a traffic class, a flow label, etc. In some cases the payload comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions a data processor for execution. Such a medium may take many forms including, but not limited to, non-volatile media and volatile media. Non-volatile media includes any non-volatile storage medium, for example, solid-state storage devices (SSD), or optical or magnetic disks such as disk drives or tape drives. Volatile media includes dynamic memory such as a random access memory. As shown, the controller virtual machine instance 630 includes a content cache manager facility 616 that accesses storage locations, possibly including local DRAM (e.g., through the local memory device access block 618) and/or possibly including accesses to local solid-state storage (e.g., through local SSD device access block 620).

Common forms of computer readable media includes any non-transitory computer readable medium, for example, floppy disk, flexible disk, hard disk, magnetic tape, or any other magnetic medium; CD-ROM or any other optical medium; punch cards, paper tape, or any other physical medium with patterns of holes, or any RAM, PROM, EPROM, FLASH-EPROM, or any other memory chip or cartridge. Any data can be stored, for example, in any form of external data repository 631, which in turn can be formatted into any one or more storage areas, and which can comprise parameterized storage accessible by a key (e.g., a filename, a table name, a block address, an offset address, etc.). An external data repository 631, can store any forms of data, and may comprise a storage area dedicated to storage of metadata pertaining to the stored forms of data. In some cases, metadata, can be divided into portions. Such portions and/or cache copies can be stored in the external storage data repository and/or in a local storage area (e.g., in local DRAM areas and/or in local SSD areas). Such local storage can be accessed using functions provided by a local metadata storage access block 624. The external data repository 631, can be configured using a CVM virtual disk controller 626, which can in turn manage any number or any configuration of virtual disks.

Execution of the sequences of instructions to practice certain embodiments of the disclosure are performed by a one or more instances of a processing element such as a data processor, or such as a central processing unit (e.g., CPU1, CPU2). According to certain embodiments of the disclosure, two or more instances of configuration 601 can be coupled by a communications link 615 (e.g., backplane, LAN, PTSN, wired or wireless network, etc.) and each instance may perform respective portions of sequences of instructions as may be required to practice embodiments of the disclosure The shown computing platform 606 is interconnected to the Internet 648 through one or more network interface ports (e.g., network interface port 623₁ and network interface port 623₂). The configuration 601 ca be addressed through one or more network interface ports using an IP address. Any operational element within computing platform 606 can perform sending and receiving operations using any of a range of network protocols, possibly including network protocols that send and receive packets (e.g., see network protocol packet 621₁ and network protocol packet 621₂).

The computing platform 606 may transmit and receive messages that can be composed of configuration data, and/or any other forms of data and/or instructions organized into a data structure (e.g., communications packets). In some cases, the data structure includes program code instructions (e.g., application code), communicated through Internet 648 and/or through any one or more instances of communications link 615. Received program code may be processed and/or executed by a CPU as it is received and/or program code may be stored in any volatile or non-volatile storage for later execution. Program code can be transmitted via an upload (e.g., an upload from an access device over the Internet 648 to computing platform 606). Further, program code and/or results of executing program code can be delivered to a particular user via a download (e.g., a download from the computing platform 606 over the Internet 648 to an access device).

The configuration 601 is merely one sample configuration. Other configurations or partitions can include further data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processor. Some embodiments include one or more special-purpose hardware components (e.g., power control, logic, sensors, transducers, etc.). A module may include one or more state machines and/or combinational logic used to implement or facilitate the operational and/or performance characteristics of saving and restoring storage devices using application-consistent snapshots.

Various implementations of the data repository comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of saving and restoring storage devices using application-consistent snapshots). Such files or records can be brought into and/or stored in volatile or non-volatile memory.

Figure 6B:
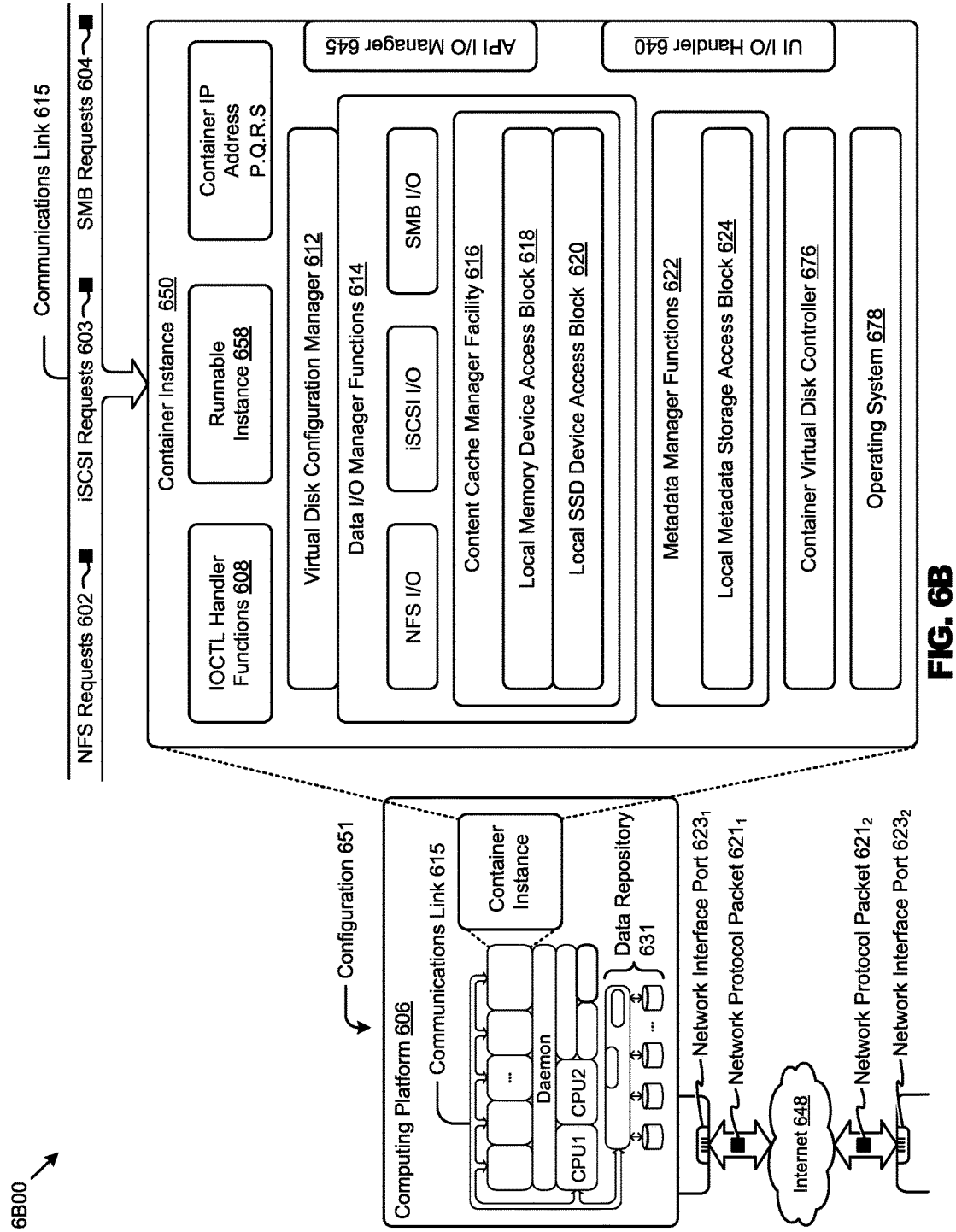

FIG. 6B depicts a containerized architecture 6B00 comprising a collection of interconnected components suitable for implementing embodiments of the present disclosure and/or for use in the herein-described environments. The shown containerized architecture 6B00 includes a container instance in a configuration 651 that is further described as pertaining to the container instance 650. The configuration 651 includes a daemon (as shown) that performs addressing functions such as providing access to external requestors via IP address (e.g., "P.Q.R.S", as shown), a protocol specification (e.g., "http:") and possibly port specifications. The daemon can perform port forwarding to the container. A container can be rooted in a directory system, and can be accessed by file system commands (e.g., "ls" or "ls -a", etc.). The container might optionally include an operating system 678, however such an operating system need not be provided. Instead, a container can include a runnable instance 658, which is built (e.g., through compilation and linking, or just-in-time compilation, etc.) to include all of the library and OS-like functions needed for execution of the runnable instance. In some cases, a runnable instance can be built with a virtual disk configuration manager, any of a variety of data IO management functions, etc. In some cases, a runnable instance includes code for, and access to a container virtual disk controller 676. Such a container virtual disk controller can perform any of the functions that the aforementioned CVM virtual disk controller 626, yet such a container virtual disk controller does not rely on a hypervisor or any particular operating system so as to perform its range of functions.

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method comprising:
quiescing multiple virtual machines in a group for an application at least by sending, from a controller virtual machine to the group a request to stop receiving a new application activity to be performed for the application, wherein
the controller virtual machine runs as a virtual machine above a hypervisor and functions as a storage controller that manages a storage pool,
the storage pool is accessible by the multiple virtual machines in the group for an application via at least the storage controller, and
a virtual machine in the group stores, via the hypervisor, data associated with the application in a volatile memory area on a computing node;
capturing a snapshot of a portion of the storage pool associated with the group; and
after capturing the snapshot, resuming receiving the new application activity on the group.

2. The method of claim 1, wherein at least one of the multiple virtual machines is interfaced with the controller virtual machine and receives a confirmation that the application activity associated with the group has been quiesced, and the controller virtual machine is interfaced with a web-based protocol interface to perform quiescing of the application activity.

3. The method of claim 2, wherein the snapshot is captured after application data has been flushed from a volatile memory area to the storage pool, and the multiple virtual machines store the application data associated with the application in the volatile memory area by using at least the hypervisor.

4. The method of claim 2, wherein each of the multiple virtual machines comprises a quiesce guest module.

5. The method of claim 1, wherein all new application activities of the group are quiesced before invoking an operation to capture the snapshot.

6. The method of claim 1, wherein the controller virtual machine is selected from multiple controller virtual machines distributed across a set of computing nodes including the computing node.

7. The method of claim 1, wherein a virtual disk is exposed to the multiple virtual machines as an addressable storage unit corresponding to multiple virtual disks structured from the storage pool that comprises a first local storage device on the computing node and a second local storage device on a separate computing node.

8. The method of claim 7, wherein the virtual disk is exposed to the multiple virtual machines as an addressable storage unit corresponding to a storage device in the storage pool.

9. A non-transitory computer readable medium having stored thereon a sequence of instructions which, when stored in memory and executed by a processor, causes the processor to perform a set of acts, the set of acts comprising:
quiescing multiple virtual machines in a group for an application at least by sending, from a controller virtual machine to the group, a request to stop a new application activity to be performed for the application, wherein the controller virtual machine runs as a virtual machine above a hypervisor and functions as a storage controller that manages a storage pool,
the storage pool is accessible by the multiple virtual machines in the group for and application via at least the storage controller, and
a virtual machine in the group stores, via the hypervisor, data associated with the application in a volatile memory area on a computing node;
capturing a snapshot of a portion of the storage pool associated with the group; and
after capturing the snapshot, resuming the new application activity on the group.

10. The non-transitory computer readable medium of claim 9, wherein the multiple virtual machines are interfaced with the controller virtual machine that receives a confirmation that the new application activity associated with the group has been quiesced.

11. The non-transitory computer readable medium of claim 10, wherein the controller virtual machine is interfaced with a web-based protocol interface to perform quiescing of the new application activity.

12. The non-transitory computer readable medium of claim 10, wherein each of the multiple virtual machines comprises a quiesce guest module.

13. The non-transitory computer readable medium of claim 9, wherein all new application activities of the group are quiesced before invoking an operation for capturing the snapshot.

14. The non-transitory computer readable medium of claim 9, wherein the controller virtual machine is selected from multiple controller virtual machines distributed across a set of computing nodes including the computing node.

15. The non-transitory computer readable medium of claim 9, wherein the snapshot is captured after application data has been flushed from a volatile memory area to the storage pool, and the multiple virtual machines store the application data associated with the application in the volatile memory area by using at least the hypervisor.

16. The non-transitory computer readable medium of claim 15, wherein a virtual disk is exposed to the multiple virtual machines as an addressable storage unit corresponding to a storage device in the storage pool.

17. A system for capturing snapshots in a virtualization environment comprising:
a non-transitory storage medium having stored thereon a sequence of instructions; and
a processor that executes the sequence instructions to cause the processor to perform a set of acts, the set of acts comprising,
quiescing multiple virtual machines in a group for an application at least by sending, from a controller virtual machine, to the group a request to stop a new application activity, wherein
the controller virtual machine runs as a virtual machine above a hypervisor and functions as a storage controller that manages a storage pool,
the storage pool is accessible by the multiple virtual machines in the group for an application via at least the storage controller, and
a virtual machine in the group store, via the hypervisor, data associated with the application in a volatile memory area on a computing node;
capturing a snapshot of a portion of the storage pool associated with the group; and
after capturing the snapshot, resuming the new application activity on the group.

18. The system of claim 17, wherein the multiple virtual machines are interfaced with the controller virtual machine that receives a confirmation that the new application activity has been quiesced.

19. The system of claim 18, wherein the controller virtual machine is interfaced with a web-based protocol interface to perform quiescing of the new application activity.

20. The system of claim 17, wherein all new application activities of the group are quiesced before invoking an operation to capture the snapshot.

21. A method, comprising:
grouping multiple virtual machines in a group for an application, wherein
the multiple virtual machines store data in a volatile memory area for the application via a hypervisor on a computing node;
quiescing the multiple virtual machines at least by stopping receiving a new application activity to be performed by a virtual machine in the group;
determining whether the multiple virtual machines are in an application consistent state based at least in part upon a state of the volatile memory area;
capturing a snapshot comprising at least the application data associated with the group after the multiple virtual machines are determined to be in the application consistent state; and
resuming receiving the new application activity after the snapshot has been captured.

22. The method of claim 21, wherein the multiple virtual machines are determined to be in the application consistent after the volatile memory area has been flushed to a storage pool accessible by the multiple virtual machines prior to capturing the snapshot.

23. The method of claim 21, quiescing the multiple virtual machines comprising:
sending, from a controller virtual machine to the multiple virtual machines, a request to quiesce the new application activity,
the controller virtual machine running as a virtual machine above a hypervisor executing on the computing node, and
the controller virtual machine managing a storage pool for the multiple virtual machines.

24. The method of claim 21, further comprising:
determining whether the multiple virtual machines is in the application consistent state with respect to the application based at least in part upon a result of quiescing the multiple virtual machines, wherein
the snapshot is captured after the multiple virtual machines have been in the application consistent state.

25. A non-transitory computer readable medium having stored thereon a sequence of instructions which, when stored in memory and executed by a processor, causes the processor to perform a set of acts, the set of acts comprising:
grouping multiple virtual machines in a group for an application, wherein
the multiple virtual machines store application data in a volatile memory area for the application via a hypervisor on a computing node;
quiescing the multiple virtual machines at least by stopping a new application activity performed by a virtual machine in the group;
determining whether the multiple virtual machines are in an application consistent state based at least in part upon a state of the volatile memory area;
capturing a snapshot comprising at least the application data associated with the group after the multiple virtual machines are determined to be in the application consistent state; and
resuming the new application activity after the snapshot has been captured.

26. The system non-transitory computer readable medium of claim 25, wherein the multiple virtual machines comprising determining whether the multiple virtual machines are determined to be in the application consistent state after the application data associated with the application in the volatile memory area for a virtual machine of the multiple virtual machines has been flushed into a persistent storage device prior to capturing the snapshot.

27. The non-transitory computer readable medium of claim 25, wherein the quiescing the multiple virtual machines sending, from a controller virtual machine to the multiple virtual machines, a request to quiesce the new application activity, wherein the controller virtual machine runs as a virtual machine above a hypervisor on the computing node and manages a storage pool for the multiple virtual machines.

* * * * *